(12) United States Patent
Lange et al.

(10) Patent No.: US 12,029,201 B2
(45) Date of Patent: Jul. 9, 2024

(54) NEST BOX SYSTEM WITH MOVABLE NEST FLOOR AND FLOOR MOVEMENT MECHANISM WITH GEAR REDUCTION

(71) Applicant: Kaiser Ag Solutions Ltd., Wetaskiwin (CA)

(72) Inventors: Gustav Lange, Millet (CA); Benjamin Kaiser, Wetaskiwin (CA); Enzo Fiorini, Edmonton (CA); Martin Kaiser, Wetaskiwin (CA)

(73) Assignee: KAISER IP CORP., Wetaskiwin (CA)

( * ) Notice: Subject to any disclaimer, the term of this patent is extended or adjusted under 35 U.S.C. 154(b) by 212 days.

(21) Appl. No.: 17/845,185

(22) Filed: Jun. 21, 2022

(65) Prior Publication Data

US 2022/0312744 A1    Oct. 6, 2022

Related U.S. Application Data

(63) Continuation-in-part of application No. 17/674,896, filed on Feb. 18, 2022, now Pat. No. 11,917,984.

(60) Provisional application No. 63/151,325, filed on Feb. 19, 2021.

(51) Int. Cl.
*A01K 31/00*    (2006.01)
*A01K 31/14*    (2006.01)

(52) U.S. Cl.
CPC ............ *A01K 31/007* (2013.01); *A01K 31/14* (2013.01)

(58) Field of Classification Search
CPC .............................. A01K 31/14; A01K 31/007
See application file for complete search history.

(56) References Cited

U.S. PATENT DOCUMENTS

| 1,561,778 | A | * | 11/1925 | Edwards | ................ | A01K 31/16 119/331 |
| 3,157,156 | A | * | 11/1964 | Peterson | ................ | A01K 31/16 119/337 |
| 3,183,889 | A | * | 5/1965 | Peterson | ................ | A01K 31/16 119/337 |

(Continued)

FOREIGN PATENT DOCUMENTS

DE    202013102427    6/2013
EP    1736047    12/2006

(Continued)

OTHER PUBLICATIONS

Translation of DE_202013102427_U1 (Year: 2013).*
Office Action (Mail Date Jul. 14, 2023) for U.S. Appl. No. 17/674,896, filed Feb. 18, 2022.

*Primary Examiner* — Monica L Perry
*Assistant Examiner* — Brittany A Lowery
(74) *Attorney, Agent, or Firm* — Schmeiser, Olsen & Watts, LLP

(57) ABSTRACT

A bird nest box system is provided that includes a nesting enclosure, a moveable nest floor, and a floor movement mechanism that moves the nest floor between a lowered position and a raised position, the nest floor being mounted over the floor movement mechanism. The floor movement mechanism includes a driveshaft, a gear assembly coupled to the driveshaft and actuatable by rotation of the driveshaft, and a lift arm. The lift arm is actuatable by the gear assembly to rotate the nest floor toward a front opening of the nest enclosure. The gear assembly provides at least one gear reduction between the driveshaft and the lift arm.

23 Claims, 24 Drawing Sheets

(56) References Cited

U.S. PATENT DOCUMENTS

| | | | | |
|---|---|---|---|---|
| 3,234,909 A | * | 2/1966 | Graves | A01K 31/16 |
| | | | | 119/337 |
| 3,783,833 A | * | 1/1974 | Bailey | A01K 41/06 |
| | | | | 119/319 |
| 5,222,459 A | * | 6/1993 | Johnson | A01K 31/16 |
| | | | | 119/330 |
| 9,510,567 B2 | * | 12/2016 | Donker | A01K 31/16 |
| 11,039,604 B2 | * | 6/2021 | van Dalen | A01K 31/06 |
| 11,553,696 B2 | * | 1/2023 | Martoni | A01K 31/16 |
| 2018/0249684 A1 | * | 9/2018 | van Dalen | A01K 31/10 |
| 2018/0288975 A1 | * | 10/2018 | Auffarth | A01K 31/22 |
| 2020/0015458 A1 | | 1/2020 | Cervera Soto | |
| 2020/0196576 A1 | * | 6/2020 | Martoni | A01K 31/165 |

FOREIGN PATENT DOCUMENTS

| | | | | |
|---|---|---|---|---|
| FR | 2801471 | | 6/2001 | |
| FR | 2801471 A1 | * | 6/2001 | A01K 31/16 |
| WO | 2006118453 | | 11/2006 | |

* cited by examiner

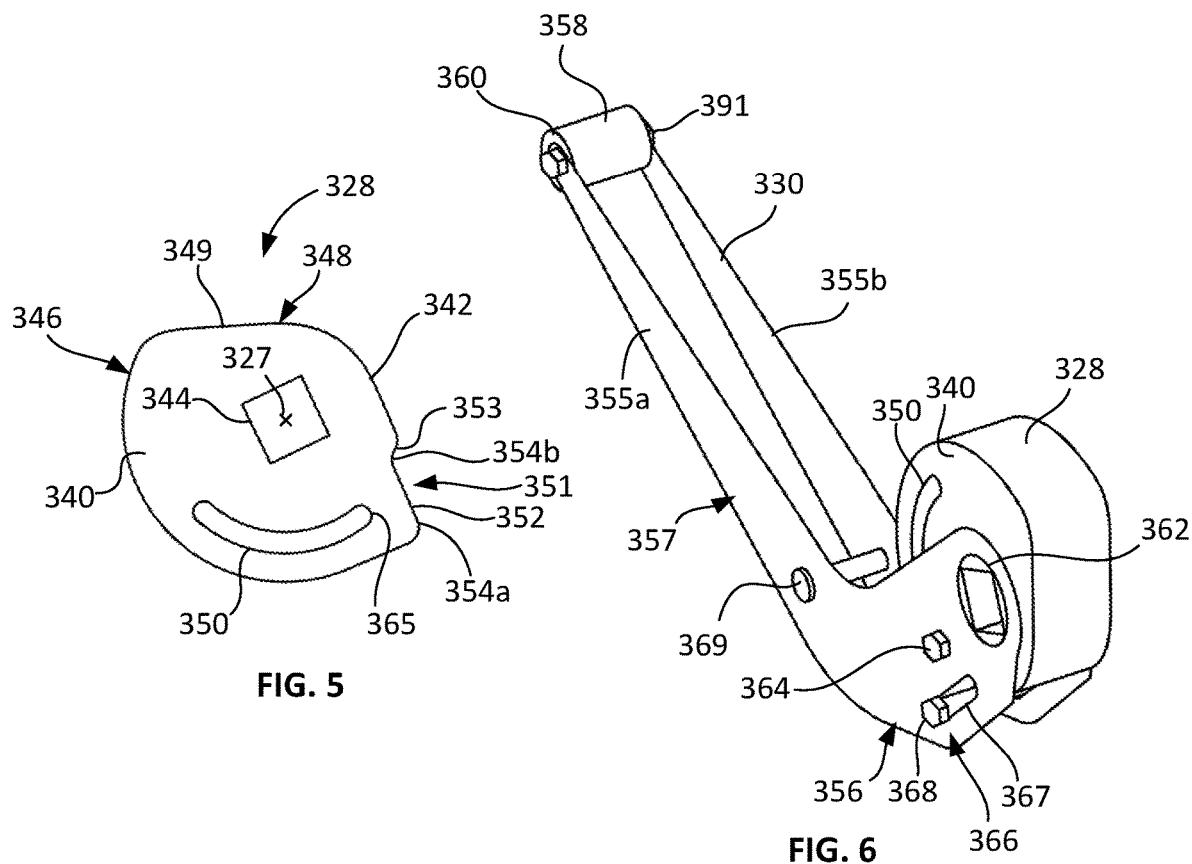
FIG. 5
FIG. 6
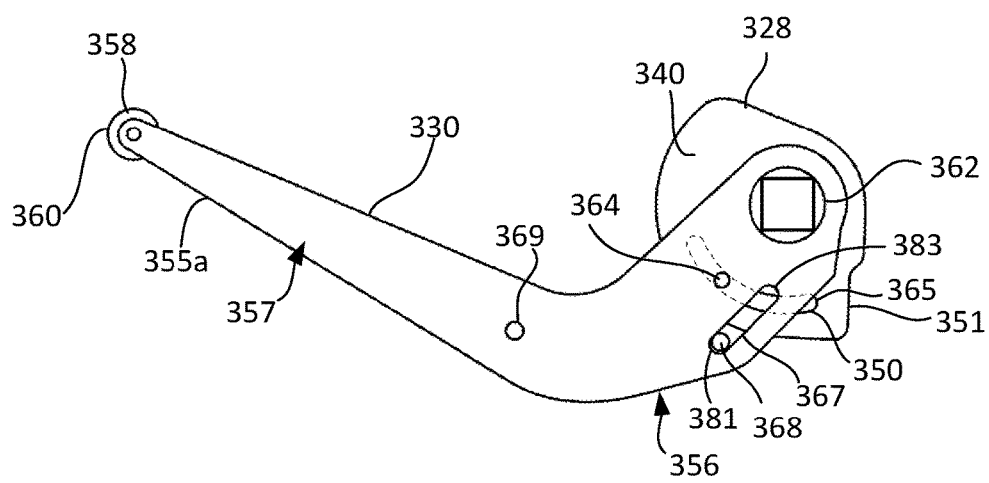
FIG. 7

NEST BOX SYSTEM WITH MOVABLE NEST FLOOR AND FLOOR MOVEMENT MECHANISM WITH GEAR REDUCTION

CROSS-REFERENCE TO RELATED APPLICATIONS

This application is a continuation-in-part of U.S. patent application Ser. No. 17/674,896, filed on Feb. 18, 2022, which claims priority to U.S. Provisional Patent Application Ser. No. 63/151,325, filed on Feb. 19, 2021, the entire contents both of which are incorporated herein by reference.

FIELD OF TECHNOLOGY

The following relates to nest boxes for chickens or other birds. Further, the following relates to nest boxes with movable nest floors.

BACKGROUND

As the egg production industry moves towards more free-run, free-range, and organic production, there are many additional challenges that a producer faces. In particular, periodic collection of eggs becomes a challenge as the birds are free to lay their eggs anywhere in the barn (aka poultry house). To facilitate the automation of egg collection, it may be desirable that most eggs are laid in a particular location. Nest boxes provide a quiet, dark, and comfortable location for the birds to lay their eggs. A nest box may include a housing defining an enclosure for a nest, a nest floor, an entrance/exit opening for birds to enter and exit, and an egg outlet through which eggs exit for collection. The entrance/exit opening may be at a front of the nest box, and the egg outlet may be in a back portion of the nest box. A nest box may typically include curtains around the entrance/exit opening to reduce light and noise inside the nest, as well as using a soft pad on the nest floor (such as Astroturf™ or a carpet material) to increase bird comfort. Typically, the nest floor is sloped or tilted towards the back of the box so that any eggs roll out through the egg outlet and onto an egg belt that collects and moves the eggs from multiple nest boxes to another location (e.g., a front of a barn).

A number of common challenges exist with this type of nest box arrangement. Some birds will not want to leave the nest box and try to stay in the box for extended periods, even all day and night. This tendency of the birds may have a negative impact on production because these birds may eat less and may prevent other birds from entering the nest. The soft material of the nest pad on the nest floor often collects debris or waste such as manure, feathers, and dust. As the eggs roll over this dirty surface, the eggs get dirty which may decrease their value. Additionally, the soft material of the nest pad may "cradle" the eggs, which may decrease their tendency to roll out of the nest box even with the usual tilt of the nest floor.

In addition, floor movement mechanisms driven by a rotatable driveshaft may twist or suffer increased wear due to stress or torque on the driveshaft during movement of the floor.

SUMMARY

An aspect relates to a bird nest box system comprising: a nesting enclosure having a front opening for a bird to enter and exit the nesting enclosure; a movable nest floor having a front end and a back end; and a floor movement mechanism that moves the nest floor between a lowered position and a raised position, the nest floor being mounted over the floor movement mechanism, the floor movement mechanism comprising: a driveshaft; a gear assembly coupled to the driveshaft and actuatable by rotation of the driveshaft; and a lift arm coupled to the gear assembly and actuatable by the gear assembly to move the nest floor, the nest floor being rotated toward the front opening by the lift arm by movement to the raised position, and wherein the gear assembly provides at least one gear reduction between the driveshaft and the lift arm.

In some embodiments, the gear assembly comprises at least one driveshaft gear rotationally fixed to the driveshaft, and at least one additional gear coupled between the driveshaft gear and the lift arm, the driveshaft gear and the at least one additional gear providing the at least one gear reduction.

In some embodiments, the driveshaft gear comprises a cylindrical gear.

In some embodiments, the at least one additional gear comprises a cam gear having an outer periphery comprising a cam portion having a cam surface.

In some embodiments: in the lowered position, the front end of the nest floor is at a higher elevation than the back end, the nest floor thereby having a tilt angle toward the back end; and from the lowered position, initial rotation of the driveshaft in a first direction rotates the cam gear to engage the cam surface with a front portion of the nest floor, thereby lifting the front end of the nest floor and increasing the tilt angle toward the back end.

In some embodiments, the cam gear is engaged with the lift arm, the lift arm has a distal end, and continued rotation of the driveshaft in the first direction further rotates the cam gear to rotate the lift arm and raise the distal end of the lift arm, the distal end thereby engaging the nest floor and raising the back end relative to the front to rotate the nest floor toward the front opening.

In some embodiments, the at least one additional gear comprises a compound gear having first and second gears, and the first gear of the compound gear is engaged with the driveshaft gear.

In some embodiments, the cam gear further comprises a ring gear portion engaged with the second gear of the compound gear.

In some embodiments, the first gear of the compound gear is larger than the second gear, the first gear and the driveshaft gear provide a first gear reduction, and the second gear of the compound gear and the ring gear portion of the cam gear provide a second gear reduction.

In some embodiments, the driveshaft gear comprises a worm gear, the worm gear and the compound gear providing the at least one gear reduction.

In some embodiments: the at least one additional gear comprises a compound gear having first and second gears, and the first gear of the compound gear is engaged with the worm gear; the lift arm comprises a rack engaged with the second gear of the compound gear, and rotation of the compound gear thereby actuates linear movement of the lift arm.

In some embodiments: the lift arm has a forward end positioned to engage a front portion of the nest floor; in the lowered position, the front end of the nest floor is at a higher elevation than the back end, the nest floor thereby having a tilt angle toward the back end; and from the lowered position, initial rotation of the driveshaft in a first direction axially extends the lift arm, the extension raising a forward end of lift arm, thereby raising a front end of the nest floor and increasing the tilt angle toward the back end.

In some embodiments, the nest box system further comprises a sliding pivot mechanism coupling the nest floor to the nesting enclosure, the sliding pivot being positioned forward of the forward end of the lift arm, the sliding pivot mechanism allowing limited vertical movement of the front end of the nest floor and allowing the nest floor to rotate about the sliding pivot mechanism.

In some embodiments, continued rotation of the driveshaft in the first direction further extends the lift arm, thereby raising the back end of the nest floor, the nest floor pivoting, about the sliding pivot mechanism and rotating toward the front opening of the nesting enclosure.

In some embodiments, in the raised floor position, the nest floor is rotated past 90 degrees relative to a horizontal plane.

According to another aspect of the disclosure, there is provided a adjustable floor system for a nest box comprising a nesting enclosure having a front opening and an egg collection area behind the nesting enclosure, the adjustable floor system comprising: a nest floor having a front end and a back end; a driveshaft; and a gear assembly coupled to the driveshaft and actuatable by rotation of the driveshaft; and a lift arm coupled to the gear assembly and actuatable by the gear assembly to move the nest floor, wherein the gear assembly provides at least one gear reduction between the driveshaft and the lift arm.

In some embodiments, the gear assembly comprises at least one driveshaft gear rotationally fixed to the driveshaft, and at least one additional gear coupled between the driveshaft gear and the lift arm, the driveshaft gear and the at least one additional gear providing the at least one gear reduction.

In some embodiments, the at least one additional gear comprises a compound gear having first and second gears, and the first gear of the compound gear is engaged with the driveshaft gear.

In some embodiments, the at least one additional gear comprises a cam gear having an outer periphery comprising a cam portion having a cam surface.

In some embodiments, the cam gear further comprises a ring gear portion engaged with the compound gear.

In some embodiments, the compound gear comprises a first gear and a second gear, the first gear being larger than the second gear, wherein the first gear engages the driveshaft gear, providing a first gear reduction, and the second gear engages the ring gear portion of the cam gear, providing a second gear reduction.

In some embodiments, the driveshaft gear comprises a worm gear, the worm gear and the compound gear providing the at least one gear reduction.

In some embodiments, the lift arm comprises a rack, and the rack engages the second gear of the compound gear, the gear assembly thereby actuating linear movement of the lift arm.

Other aspects and features of the present disclosure will become apparent to those ordinarily skilled in the art upon review of the following description of the specific embodiments of the disclosure.

BRIEF DESCRIPTION

Some of examples will be described in detail, with reference to the following figures, wherein like designations denote like members, wherein:

FIG. 5 is a side view of a lift cam member of the system of FIGS. 3 and 4 in isolation, according to some embodiments;

FIG. 6 is a perspective view of the lift cam member and a lift arm of the system of FIGS. 3 and 4, according to some embodiments;

FIG. 7 is a side view of the lift cam member and lift arm of FIG. 6;

DETAILED DESCRIPTION

The terms "front" and "back" and other similar terms such as "backward", "rearward", "forward", etc. are used herein for ease of description and do not limit the embodiments to any particular orientation in normal operation.

The term "coupled" as used herein may refer to either direct connections or to indirect connections via one or more intermediate elements. The term. "coupled" does not require direct physical connection of two elements unless otherwise specified herein.

In a poultry barn, many different arrangements for nest boxes may be employed. In some systems, multiple stacked tiers of nest boxes may be provided together with a feed distribution system, watering system, and multiple nest floors for the birds to walk on. Such arrangements are common as they increase the number of birds in a barn as they can spread out over the plurality of tiers. These multi-tier systems may reduce the operating cost of the barns as there is less is volume to heat and ventilate. Alternative multi-tier systems may be arranged such that there are two nest boxes back-to-back on the same tier, such that eggs from both boxes roll onto a single egg belt.

Figure 1A:
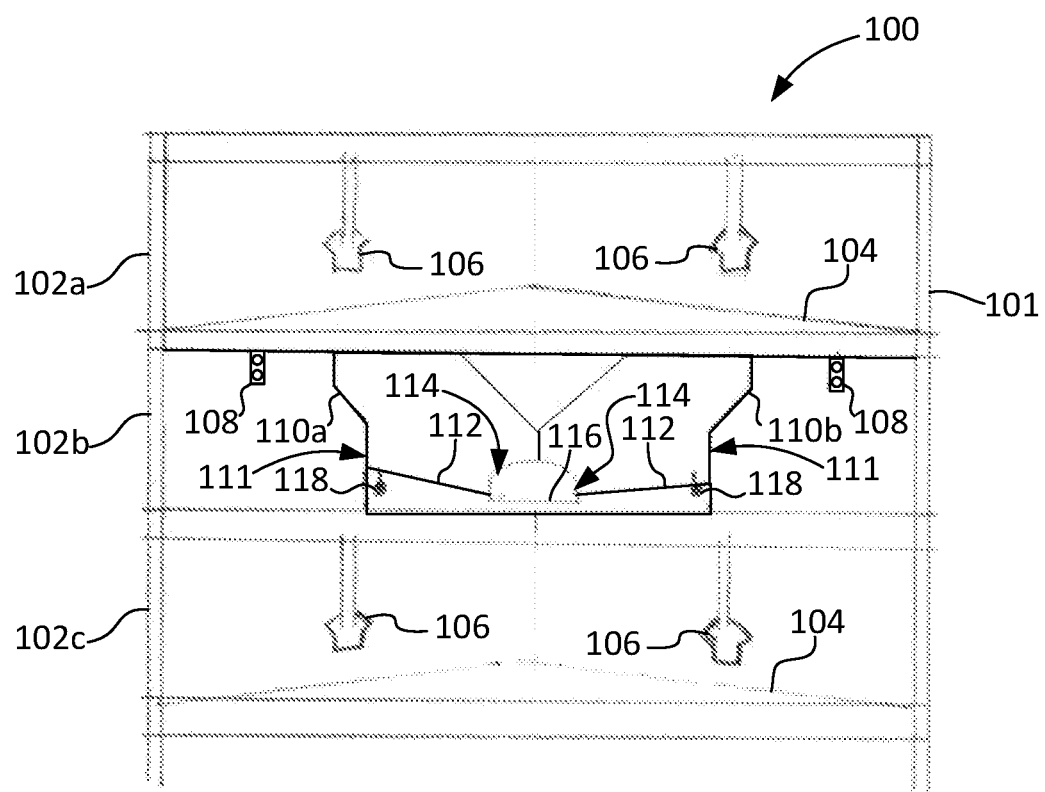
FIG. 1A is a cross section view of an example nesting system including nest boxes.
Figure 1B:
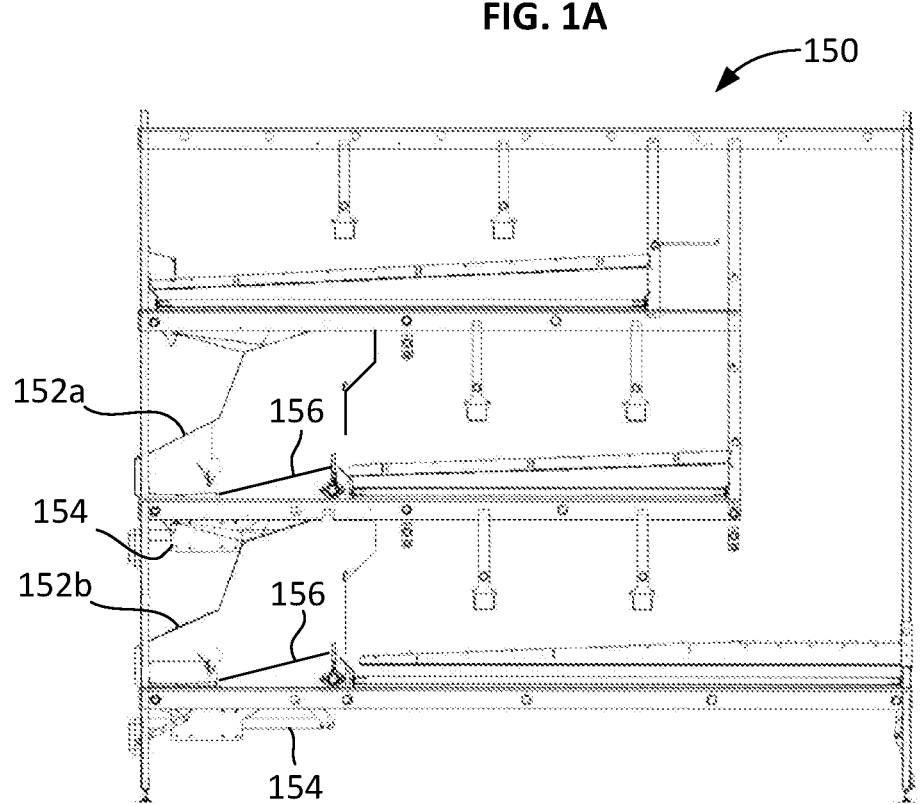
FIG. 1B is a cross section view of another example nesting system including nest boxes.
Figure 2:
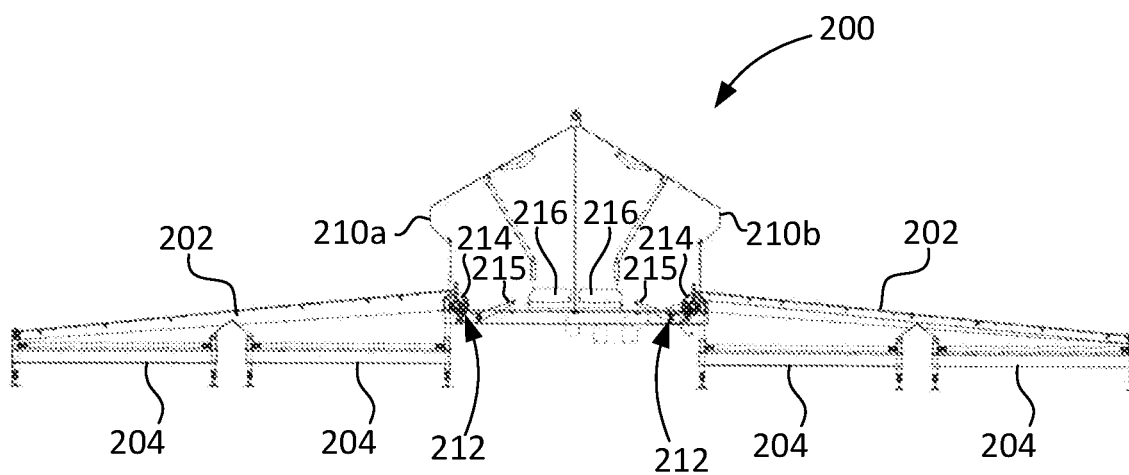
FIG. 2 is a cross section view of still another example nesting system including nest boxes.

FIGS. 1A to 2 show example systems (100, 150, 200) that may include one or more nest boxes according to the present disclosure. However, embodiments are not limited to the specific exemplary systems shown in FIGS. 1A to 2. The structure and configuration of nesting systems may vary. In still other systems, birds may simply live on the barn nest floor then enter a nest box, according to some embodiments of the present disclosure, to lay their eggs.

FIG. 1A is a cross section view of an example nesting system 100, The system includes a cage assembly 101 with three tiers or levels 102a, 102b, and 102c and cage nest floors 104. A feed distribution system includes feed trough assemblies 106, and a watering system includes water assemblies 108. This example system 100 includes first and second nest boxes 110a and 110b, which are arranged back-to-back on middle level 102b. The nest boxes 110a and 110b are each in the form of an enclosure with a respective front opening 111 for birds to enter/exit, and a respective movable nest floor 112. The movable nest floor 112 is inclined to encourage eggs to roll toward an egg outlet 114 and a central egg belt 116 that carries eggs from both nest boxes 110a and 110b out of the system 100, The nest floors 112 are each mounted to an adjustment mechanism comprising a driveshaft 118 that may lift and/or rotate the nest floor to eject a bird from the corresponding nest box 110a or 110b.

FIG. 1B is a cross section view of another example nesting system 150. In this example, two nest boxes 152a and 152b are stacked on different levels of the system. In this example, the nest boxes each include a linear actuator 154 for actuating movement of the nest floors 156.

FIG. 2 is a cross section view of an example single tier nesting system 200. The system 200 includes back-to-back nest boxes 210a and 210b, though embodiments are not limited to nest boxes being arranged back-to-back. The number, placement, size and configuration of nest boxes may vary. The example system 200 includes elevated nest floors 202 with manure belts 204 positioned below for removal of waste. The nest boxes 210a and 210b each include a respective floor movement mechanism 212 comprising a driveshaft 214 and lift arm 215 for raising a nest floor of the corresponding box 210a or 210b. In this example, two egg belts 216 are provided, with each nest box 210a and 210b outputting eggs to a respective one of the egg belts 216.

Typically, the behavior of birds changes throughout the day, and it may be desirable for a nest box system with movable nest floors (such as the examples of FIGS. 1 and 2) to be adjusted through the day. In the morning, and throughout the day, the birds may be laying their eggs, and therefore they need to have access to nest boxes. For bird comfort, the nest floor may be close to horizontal (i.e., angle of inclination close to zero). Published guidelines show birds prefer nest floors that are not significantly sloped, and therefore it is ideal to keep the angle of the nest floor close to zero when the nest floor is down. From industry studies, this angle is typically less than 10 degrees. However, if the angle of the nest floor is too shallow, then the eggs may not roll out the egg outlet and onto the egg belt. Thus, it may be desirable to increase the angle of inclination of the nest floor to approximately 15 degrees. In the evening and overnight, the birds may roost, and they will no longer lay eggs. To prevent the birds from sleeping in the nest boxes it is common to close the front of the nest, push the birds out with a moving arm, or to lift the nest floor to (or beyond) an angle that is uncomfortable for the birds. This lifting may slope or tilt the nest floors toward the front openings (rather than toward the egg outlets at the back) to expel the birds from the front opening of the nest boxes. Additionally, raising the nest floor allows any debris to fall off, and thus helps produce cleaner eggs.

Existing solutions for moving the nest floor may only allow limited movement of the nest floor and/or may require a driveshaft to rotate in multiple directions to provide sequential lifting of front and back ends of the nest floor. It may be desirable to move a nest floor through multiple positions by rotation of a driveshaft in a single direction. These positions may include, but are not limited to: lowered; increased tilt toward egg outlet; partially raised toward front; and fully raised.

Figure 3:
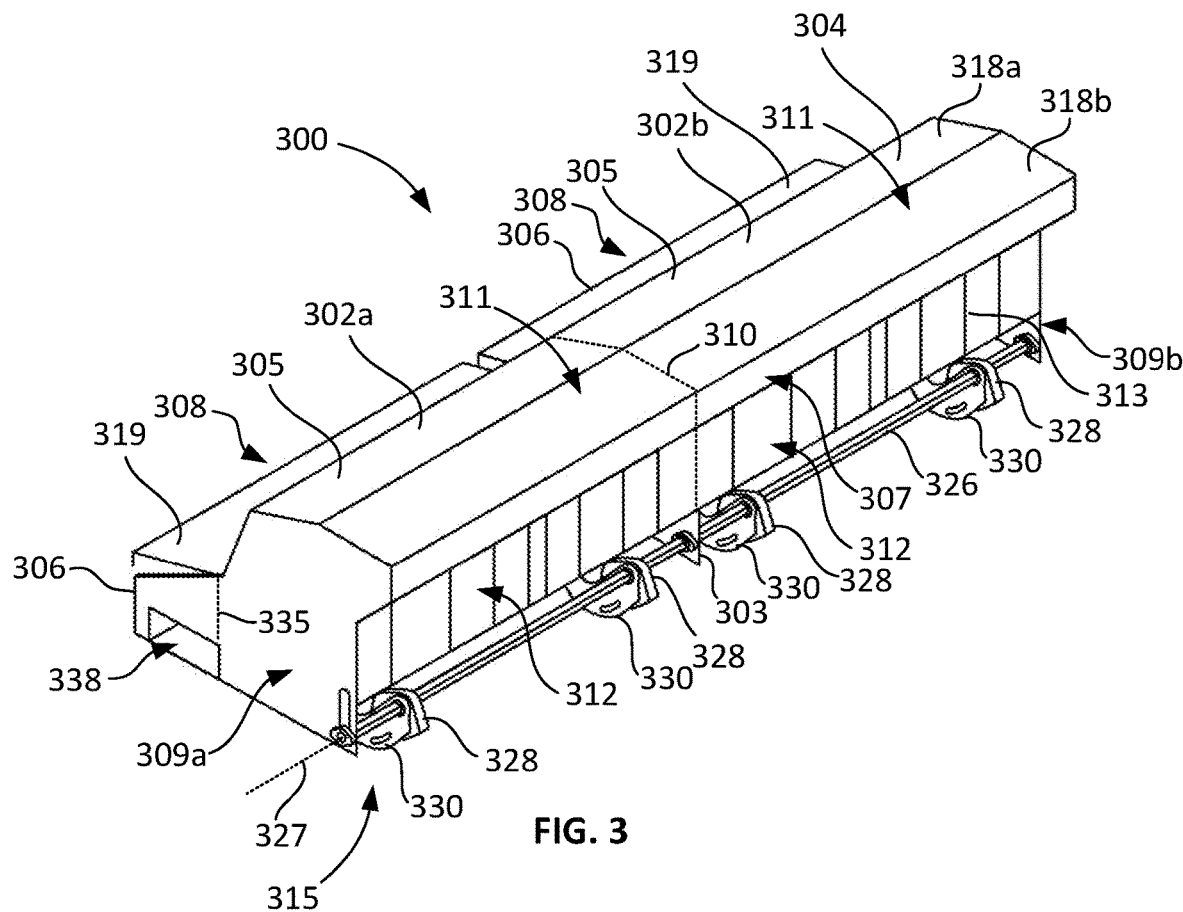
FIG. 3 is a front perspective view of a nest box system according to some embodiments, which includes nest boxes having adjustable nest floors.
Figure 4:
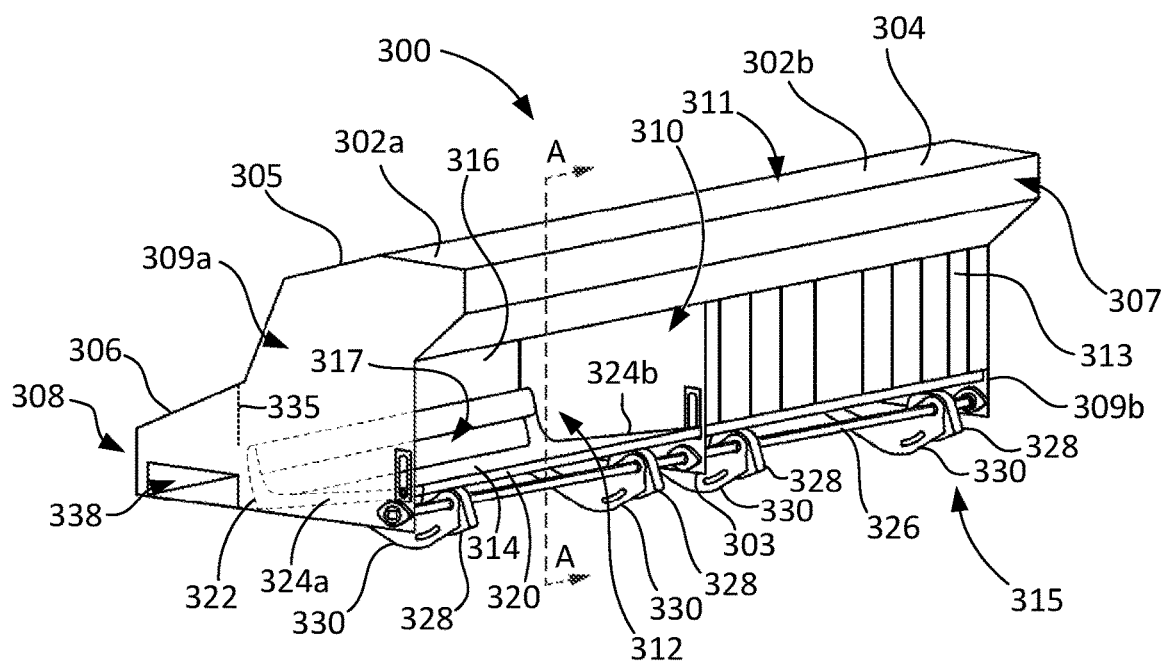
FIG. 4 is another front perspective view of the nest box system of FIG. 3.

FIGS. 3 and 4 are front perspective views of a nest box system 300 according to some embodiments. The nest box system 300 includes first and second adjacent nest boxes 302a and 302b, which are separated by a nest box divider wall 303 of the system 300. Each of the nest boxes 302a and 302b may have a similar structure and operation. The number of nest boxes may vary in other embodiments. In some embodiments, one or more single nest boxes may be provided in isolation without other adjacent nest boxes.

The system 300 of FIGS. 3 and 4, comprises a housing 304. The housing 304 forms, for each nest box 302*a* and 302*b*, a respective nesting enclosure 305 and optionally a respective egg collection enclosure 306. For each nesting box, 302*a* and 302*b*, the housing 304 has a front 307, a back 308, a first side (309*a* or 309*b*), a second side 310, and a top 311. Each egg collection enclosure 306 portion of the housing 304 is positioned behind the corresponding nesting enclosure 305 portion of the housing 304. The shared nest box divider wall 303 forms the second side 310 for each nest box 302*a* and 302*b* in this embodiment. The housing 304, including the nesting enclosure 305 and egg collection enclosure 306 may take other forms in other embodiments. In some embodiments, an egg collection area may not include an egg collection enclosure.

The nesting enclosure 305, for each nest box 302*a* and 302*b*, defines a respective front opening 312 for birds (e.g., chickens) to enter and exit the nest boxes 302*a* and 302*b*. The openings 312 are optionally covered by curtains 313 (as shown in FIG. 3) or another covering that allows birds to walk into and out of the enclosure while also while reducing outside noise and light that enters the enclosure. The curtains 313 of the first nest box 302*a* are removed in FIG. 4 so that the interior of the first nest box 302*a* is visible.

The housing 304 may comprise any suitable material. For example, the sides 309*a* and 309*b* may be a material chosen to provide structural strength to the nest boxes 302*a* and 302*b* and/or reduce the noise within the nest boxes 302*a* and 302*b*. For example, the material of at least the sides 309*a* and 309*b* may comprise be sheet metal and/or wood. The housing 304 shown in FIGS. 3 and 4 is provided by way of non-limiting example. Nesting box enclosures of various sizes, shapes and configurations may be used with the disclosed systems and methods.

The nest box system 300 includes, for each nest box 302*a* and 302*b*, a respective movable nest floor 314 (shown in FIG. 4) positioned within the respective nesting enclosure 305. The nest box system 300 further includes a floor movement mechanism 315 that moves the nest floor 314 as described below. Each nest floor 314 has a front end 320, a back end 322 and sides 324*a* and 324*b*. According to an aspect, a nest floor system comprising the nest floor 314 and the floor movement mechanism 315 may be provided separately from the housing 304.

The floor movement mechanism 315 comprises a driveshaft 326 and at least one nest floor actuation member coupled to the driveshaft 326. The at least one nest floor actuation member in this embodiment comprises a plurality of lift cam members 328 and a plurality of lift arms 330. Each lift arm 330 is coupled to a respective lift cam member 328 in this embodiment. The driveshaft 326 has a longitudinal axis 327 and extends laterally (relative to the nest boxes 302*a* and 302*b*) at a position below the nest floors 314.

In this embodiment, the at least one nest floor actuator comprises, for each nest box (302*a*, 302*b*): a respective a pair of the lift cam members 328 and a respective pair of the lift arms 330. More or fewer lift cam members 328 and lift arms 330 may be used in other embodiments. In other embodiments, a different actuation members may be used to move the nest floor 314. Embodiments are not limited to the specific lift cam members 328 and lift arms 330 shown in FIGS. 3 and 4. The number and positioning of the lift arms 330 and lift cam members 328 along the driveshaft may also vary. In some embodiments, each nest box 302*a* and 302*b* may include only one lift cam members 328 and/or one lift arm 330, or more than two lift cam members 328 and/or lift arms 330 may be used.

As will be explained in more detail below, rotation of the driveshaft 326 in a first direction moves causes the at least one nest floor actuation member (lift cam members 328 and lift arms 330 in this embodiment) to move the nest floor 314 from a lowered (nesting) position to a fully raised position. The movement from the lowered position to the fully raised position comprises: (1) initially tilting the nest floor 314 toward the back 308 of the nesting enclosure 305; and then (2) rotating the nest floor 314 toward the front opening 312 of the nest enclosure. In the first stage (1), the initial tilting toward the back 308 of the nesting enclosure 305 increases an angle of inclination of the nest floor 314 from the back end 322 to the front end 320, which may help urge any eggs left on the nest floor 314 to roll through an egg outlet 317. In the subsequent stage (2), the rotation tilts the nest floor 314 in the opposite direction. This may be accomplished by raising the back end 322 of the nest floor 314, which initially tilts the nest floor 314 toward the front 307. This second stage (2) of movement may help expel birds from the nesting enclosure 305 through the front opening 312. Movements (1) and (2) may be accomplished by continuous rotation of the driveshaft 326 in one direction, as will be explained below. Rotation of the driveshaft the opposite direction may then return the nest floor 314 to the lowered position.

The housing 304 in this example further includes, for each nest box 302*a* and 302*b*, an optional partition 316 (visible in FIGS. 8, 9 and 11 to 13) between the nesting enclosures 305 and the egg collection enclosure 306. Each partition 316 defines the egg outlet 317 therethrough (shown in FIGS. 8, 9 and 11 to 13) to allow eggs to roll from the nest floor 314 in the nesting enclosure 305 to the corresponding egg collection enclosure 306. The partition 316 and the egg outlet 317 are positioned at a back 321 of the nesting enclosure 305 (see FIG. 8). The partition 316 forms a partial barrier between the nesting enclosure 305 and the egg, collection enclosure 306 to help prevent birds from leaving through the back 308 of the nesting enclosure 305 into the egg collection enclosure 306. The partition may comprise a same material as the remainder of the housing (e.g., sheet metal) in some embodiments. A stippled line 335 in FIGS. 3 and 4 represents the approximate position where the partition 316 meets the first side 309*a*. The partition may abut, or nearly abut, the top panel 319 of the egg collection enclosure 306, but the top panel is not connected to the top panel 319 in this embodiment (to allow the top panel 319 to be opened without removal or disconnection from the partition 316.

The top 311 of the nesting enclosure 305 may comprise one or more removable windows, removable panels (such as top panel 318*a* or 318*b*), doors and/or other means (not shown) to provide additional access the interior of the nesting enclosure 305. Such access means may allow a user to inspect the nest boxes (302*a* and 302*b*), check on birds, and/or perform repairs on the nest box (302*a* or 302*b*), for example. Similarly, a top panel or cover 319 of the egg collection enclosure 306 may be removable or openable to provide access to the interior of the egg collection enclosure 306.

Optionally, an egg belt 336 (shown in FIGS. 8, 9 and 11 to 13) extends through the egg collection enclosure 306 for bringing eggs to another location. The egg belt may comprise a conveyor belt of any suitable material or configuration for moving eggs. The egg belt 336 in this example may extend through side openings 338 of the egg collection enclosure 306. In this example, the egg belt 336 is positioned rearward of the nest floor 314 and egg outlet 317 and extends through the egg collection enclosures 306. The egg belt 336 is positioned to catch eggs as they roll into the egg collection enclosures 306a and 306b. The egg belt 336 in this example extends laterally through side openings 338 of the system 300. Each of the sides 309a and 309b defines a respective one of the side openings 338, although the egg belt 336 and side openings 338 may be omitted in other embodiments. The egg belt 336 may collect eggs from multiple nest boxes (302a and 302b) and transport them to another location, such as a front of a barn for easier, more automated collection. However, the egg belt 336 may be omitted in other embodiments, and a person may manually collect the eggs from this area once they have rolled off the nest floor 314.

A feature may be added to slow or control speed of eggs as they roll out of the nesting enclosure 305 and onto the egg belt 336. Such egg safety features may be referred to as "egg savers" (not shown) and may reduce the speed of eggs and onto the egg belt. The egg saver may, for example, comprise a cable or rope that runs parallel to the egg belt at stops the eggs from crashing onto the egg belt. Periodically, this cable may be raised and lowered, allowing the eggs to slowly roll onto the egg belt.

For each nest box 302a and 302b, the respective nest floor 314 is mounted within the corresponding nesting enclosure 305 and over the corresponding floor movement mechanism 315 of the nest box 302a or 302b. The driveshaft 326 in this embodiment is shared by the first and second nest boxes 302a and 302b. Thus, rotating the driveshaft 326 may actuate the nest floors 314 of both nest boxes (302a and 302b). In other embodiments, each nest box 302a and 302b may be provided with separate and individually controllable driveshafts. Any suitable motor, actuator, and/or other mechanical power source may be used to impart rotation to the driveshaft 326.

FIG. 5 is a side view of one of the lift cam members 328 and the driveshaft 326 in isolation. In this embodiment, the lift cam members 328 shown in FIG. 4 each have the same structure as the one shown in FIG. 5. However, different lift cam members and combinations of such may be used in other embodiments. In this embodiment, the lift cam member 328 is mounted to the driveshaft 326 (shown in FIGS. 3 and 4), such that the lift cam member 328 rotates together with the driveshaft 326.

The lift cam member 328 in this example is in the form of a cam plate having an irregular, non-circular disc shape. Specifically, the lift cam member 328 has a first face 340, an opposite second face (not visible) that mirrors the first face 340, and a non-circular rim 342 extending between the first face 340 and the second face. The rim 342 forms an outer periphery of the lift cam member 328. The lift cam member 328 defines a hole 344 therethrough, from the first face 340 to the second face. In this example, the driveshaft 326 (FIGS. 3 and 4) has a square profile and the hole 344 has a square profile complimentary to the driveshaft 326 so that the lift cam member 328 is rotationally locked with the driveshaft 326 when mounted thereon. However, embodiments are not limited to any particular driveshaft profile shape.

The lift cam member 328 has an asymmetrical profile about the longitudinal axis 327 of the driveshaft 326. That is, the non-circular rim 342 of the lift cam member is asymmetrical about the hole 344 and driveshaft 326. The asymmetrical profile defines a nose portion 346 and a heel portion 348. The heel portion 348 has a minimum radius from the longitudinal axis 327 (which may be referred to as a 'base circle' radius). The approximate position of the longitudinal axis 327 when the lift cam member 328 is mounted on the driveshaft 326 (FIGS. 3 and 4) is illustrated in FIG. 5. The nose portion 346 has a larger radius, relative to the longitudinal axis 317, than the heel portion 348. A ramp 349 between the heel portion 348 transitions from the base radius of the heel portion 348 to the second, larger radius of the nose portion 346. The heel portion 348, the ramp 349 and the nose portion 346 collectively function as a cam surface to actuate movement of the nest floor 314 as the lift cam member 328 is rotated under the nest floor 314, The radial change between the base radius of the heel portion 348 and the largest radius of the nose portion 346 may be referred to as "lift" distance of the lift cam member 328, and this "lift" distance is the distance by which the lift cam member 328 can raise the nest floor 314.

The lift cam member 328 in this embodiment optionally defines an arcuate slot 350 therethrough that extends in a circular arc about the hole 344 and longitudinal axis 327. As will be explained below, the arcuate slot 350 cooperates with the lift arm 330 (see FIG. 7) to allow a limited degree of rotation of the lift arm 330 relative to the lift cam member 328.

The lift cam member 328 optionally includes a catch section 351 for a catch mechanism 366 described below (see FIG. 6). In this embodiment, the catch section 351 is positioned between the heel portion 348 and the nose portion 346 (at an opposite end of the heel portion 348 than the ramp 349). The catch section 351 which includes a straight rim portion 352, and a step 353. The straight rim portion 352 extends in a straight path tangential to the longitudinal axis 327. The straight rim portion 352 has a first end 354a positioned adjacent the nose portion 346 and a second end 354b positioned adjacent the step 353. The first end 354a of the catch section 351 forms a corner (which may be relatively sharp) with the nose portion 346. The step 353 is raised relative to the catch section 351.

FIGS. 6 and 7 are a perspective and side views, respectively, of the lift cam member 328 of FIG. 5 and a corresponding lift arm 330 in isolation. Each of the lift arms 330 of the system 300 (FIGS. 3 and YY) have the same structure in this embodiment, though different lift arms and combinations of such may be used in other embodiments. In this embodiment, the lift arm 330 pivotably couples to the driveshaft 326 (FIGS. 3 to 5).

Figure 13:
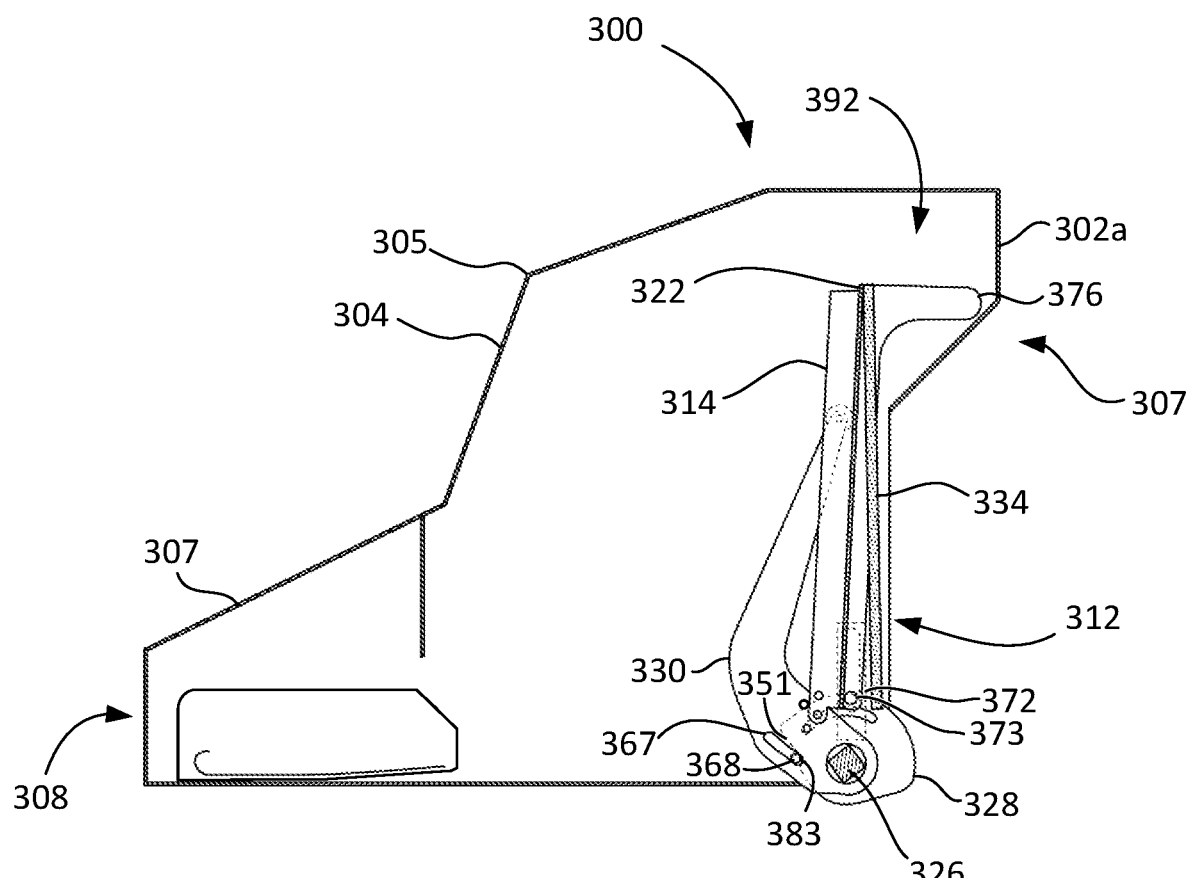
FIG. 13 is a side cross-sectional view of the nest box, showing the nest floor in a fully raised position.

As shown in FIG. 6, the lift arm 330 of this embodiment comprises first and second arm pieces 355a and 355b, which mirror each other in this embodiment. The lift cam member 328 is positioned between the first and second arm pieces 355a and 355b, In other embodiments, the lift arm may comprise a single piece rather than mirrored first and second pieces 355a and 355b. The first and second pieces 355a and 355b of the lift arm 330 in this embodiment are each generally L-shaped having a first L-section 356 proximal to the lift cam member 328 and a second L-section 357 distal to the lift cam member 328. The first L-section 356 is at an angle to the second L-section 357. The first L-section 356 of first arm piece 355a is against the first face 340 and the first L-section 356 of the second arm piece 355b is against the second face of the lift cam member. However, embodiments are not limited to a particular lift arm shape or configuration. For example, a straight or curved lift arm may be used in other embodiments. The angle of the bend between the first L-section 356 and the second L-section 357 may also vary. The angle may be approximately 90 degrees or less (where 0 degrees represents the first and second L-sections extending in a straight line). The angle may, for example, be in the range of 40 to 80 degrees. In the embodiment of FIGS. 6 and 7, the angle of the bend is approximately 70 degrees. The angle between the first L-section 356 and the second L-section 357 may allow the lift arms 330 to rotate the nest floor 314 past vertical (as shown in FIG. 13) while providing clearance between the lift arms 330 and other components of the system 300 (such as pin 380 discussed below and shown in FIG. 10).

Optionally, the lift arm 330 includes a roller 358 or bumper at a distal end 360 of the lift arm 330 for engaging the nest floor 314. The roller 358 in this example is connected between the first and second arm pieces 355a and 355b at the distal end 360.

Each of the first and second lift arm pieces 355a and 355b defines a respective pivot hole 362 therethrough for receiving the driveshaft 326. These holes 362 may collectively be referred to as a pivot hole 362 through the lift arm 330, for each of reference. In this example, the pivot hole 362 is circular and sized to fit the driveshaft 326 therethrough such that the lift arm 330 can pivot about the longitudinal axis 327 of the driveshaft 326. In other embodiments, the lift arm 330 may instead be rotationally locked with the driveshaft 326.

In this embodiment, the lift arm 330 is coupled to the lift cam member 328 such that the lift arm 330 is rotatable, though a limited range of motion, relative to the lift cam member 328 and driveshaft 326. Specifically, the lift arm 330 is pivotably coupled to the lift cam member 328. The rotation limiting mechanism that limits rotation of the lift arm 330 relative to the lift cam member 328 in this example comprises the arcuate slot 350 through the lift cam member and a first arm first arm pin 364 (or other guide member) that is fixed to the lift arm 330 and slidably received in the arcuate slot 350. The first arm pin 364 can slidably travel along the length of the arcuate slot 350 (in a circular arc about the driveshaft 326) such that the lift cam member 328 can rotate through a limited range of motion relative to the lift arm 330. An end 365 (see FIG. 5) of the arcuate slot 350 acts as a stop for the first arm pin 364, such that, when the first arm pin 364 engages the end 365 (shown in FIGS. 5 and 6), further rotation of the cam member 328 (in the clockwise direction in FIGS. 6 and 7) will cause the lift arm 330 to rotate in the same direction. Different mechanisms for limiting rotation within an allowed range of motion may be used in other embodiments. In other embodiments, the lift arm 330 may always be rotationally locked with the lift cam member 328. The term "pin" as used herein may refer to any guide member structure that extends into a slot or other guide track. For example, a pin may be a simple rod extension. However, pins received in slots may take various forms, and embodiments are not limited to a particular structure of such pins (or other guide member structures).

Optionally, the floor movement mechanism 315 further includes a catch mechanism 366 or other latch mechanism that rotationally locks the lift arm 330 and the lift cam member 328 for rotational movement to lower the lift arm 330 from a raised position. The catch mechanism 366 may be disengaged while the driveshaft 326 is rotated in a first direction (e.g., clockwise) to raise the lift arm 330 and the nest floor 314. The catch mechanism 366 may engage the lift arm 330 when the driveshaft 326 is rotated a second, opposite direction (e.g., counter-clockwise) to lower the lift arm 330. The catch mechanism 366 in this example comprises: a catch slot 367 defined in the lift arm 330 (in each of the first and second arm pieces 355a and 355b); a catch pin 368 that extends through the catch slot 367 and between the first and second arm pieces 355a and 355b; and the catch section 351 of the rim 342 of the lift cam member 328 (see FIG. 7). The catch slot 367 is generally parallel with the first L-section 356 of the lift arm 330. The catch slot has a first catch slot end 381 positioned such that, when the catch pin 368 is at the first catch slot end 381, the catch pin 368 is clear of the lift cam member 328. The catch slot has a second catch slot end 383.

At least a portion of the catch section 351 of the lift cam member 328 is alignable with the slot 367 to provide clearance for the catch pin 368 to slide toward the second catch slot end 383. That is, when the catch section 351 of the lift cam member 328 is rotated to a position providing clearance for the catch pin 368, the catch pin 368 can slide to the second catch slot end 383. Operation of the catch mechanism 366 is discussed below. Other releasable catch or latch mechanisms could be used rather than the specific example described herein. For example, a spring latch, releasable pawl, or other latch system could be used. In other embodiments, the catch mechanism 366 may be omitted.

Embodiments are not limited to the specific structures of the lift cam members 328 and lift arms 330 shown in FIGS. 5 to 7. The number and positioning of arms 330 and lift cam members 328 along the driveshaft 326 (FIG. 4) may also vary, and pairs are not required. In some embodiments, each nest box 302a and 302b may include only one lift cam members 328 and/or one lift arm 330, or more than two lift cam members 328 and/or lift arms 330 may be used.

Optionally, at least one additional pin 369 interconnects the first and second arm pieces 355a and 355b in the second L-section portion 357.

Figure 8:
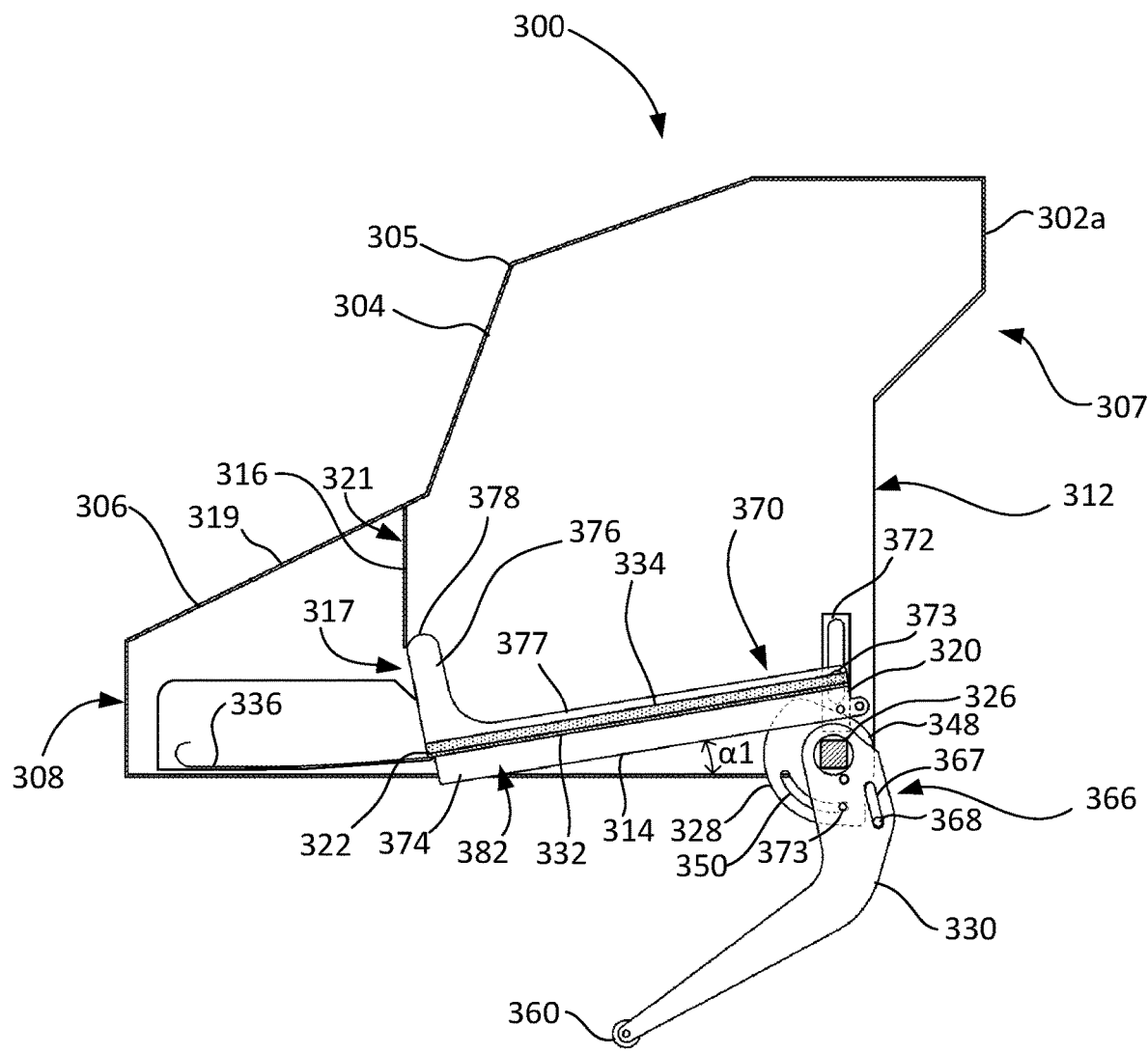
FIG. 8 is a side cross-sectional view of a nest box of the system, showing a nest floor in a lowered position.

FIG. 8 is a side cross-sectional view of the nest box system 300 taken along the line A-A in FIG. 4 (through the first next box 302a). FIG. 8 shows the nest floor 314 in a lowered position. The driveshaft 326 and one pair of lift cam member 328 and lift arm 330 are shown positioned under a front portion 370 of the nest floor 314.

The nest box 302a in this example further includes an optional sliding pivot mechanism 371 for restricting forward and rearward (horizontal) movement of the front end 320 of the nest floor 314. In this embodiment, the sliding, pivot mechanism 371 comprises a pair of vertically aligned guide tracks 372 (e.g., comprising slots) and a pair of pivot members 373 (e.g., pins) fixed to the sides 324a and 324b (see FIG. 2) of the nest floor 314 at or near the front end 320 of the nest floor 314. Each guide track 372 is mounted within the nesting enclosure 305 on a respective one of the sides 309a and 310 of the housing 304 and positioned in the front portion 370 of the nest floor 314 (near the front end 320) when the nest floor 314 is in the lowered position shown in FIG. 8. Each pivot members 373 is slidably 372 received in the corresponding vertically aligned guide track 372 and may move vertically, but not horizontally, therein. The sliding pivot mechanism 371 thereby prevents forward/rearward movement of the front end 320 of the nest floor 314, while allowing vertical movement of the front end 320, as well as pivoting of the nest floor 314 about the pivot members 373 at (or near) front end 320. Other pivoting and/or movement guiding means to control or restrict movement of the nest floor 314 may be used in other embodiments.

FIG. 8 also shows partition 316, which is in the form of a wall extending between sides of the nesting enclosure 305. The partition 316 partially divides the nesting enclosure 305 and the egg collection enclosure 306, while leaving open the egg outlet 317 near the back end 322 of the nest floor 314.

The nest floor 314 in this embodiment is an assembly comprising a structural base 332, which may comprise a panel of sheet metal, wood, and/or wire mesh, for example. The nest floor 314 may further comprise a nest pad 334 made from softer material positioned on the structural base 332. For example, the nest pad 334 may comprise a material chosen to provide birds comfort while they nest on the nest floor 314. Non-limiting examples of such materials include synthetic grass (e.g., Astroturf™) or carpet. The nest floor 314 may comprise any suitable material for supporting a bird nest and allowing the movement of the nest floor 314 described herein.

Figure 10:
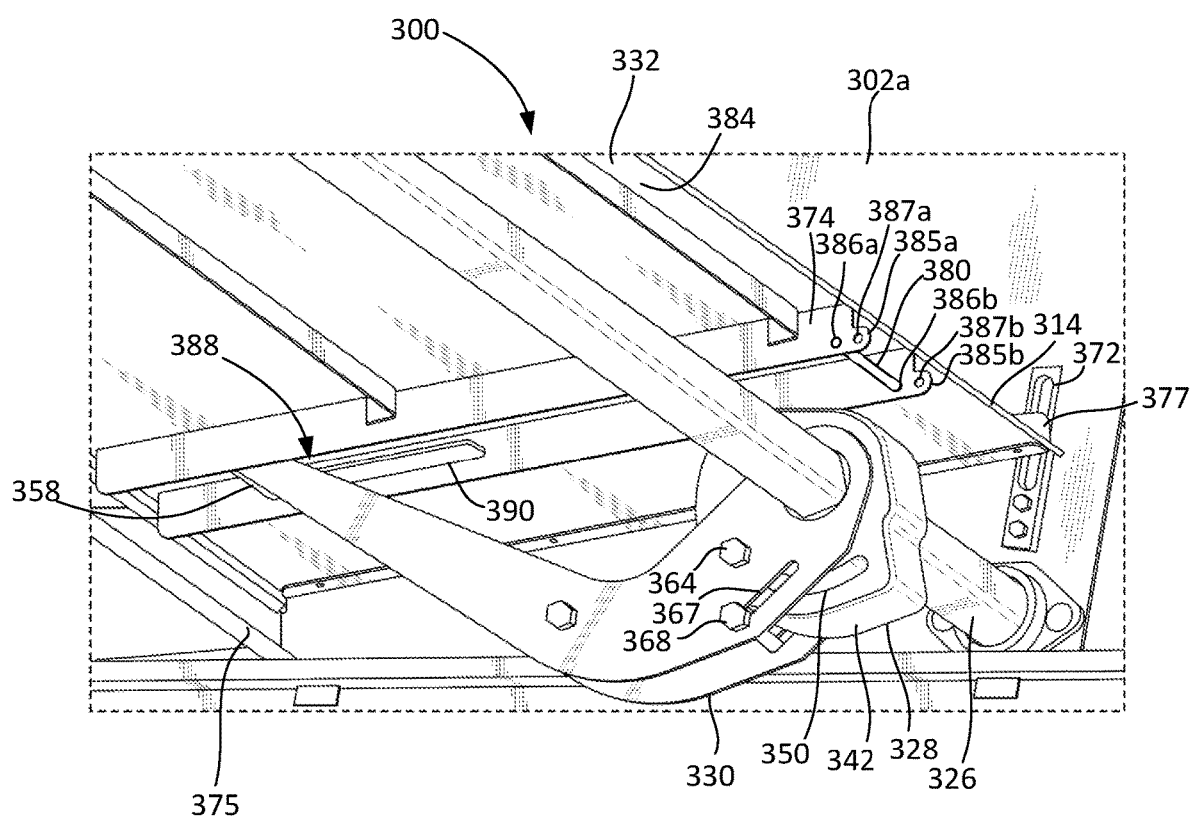
FIG. 10 is a lower, front, partial perspective view of the system of FIGS. 3 and 4.

The nest floor 314 further optionally comprises, for each floor movement mechanism 315, a respective bracket 374 mounted to an underside of the base 332. The bracket 374 is best shown in FIG. 10 and cooperates with the floor movement mechanism 315 as discussed below.

The nest floor 314 further comprises an optional fence structure 376 is also mounted to the structural base 332. The fence structure 376 includes two side walls 377 positioned on opposite sides of the nest floor 314. The side walls 377 in this example extend from the front end 320 to the back end 322 of the nest floor 314. The side walls 377 define upward extending fence supports 378 at or near the back end 322 of the nest floor 314. The term "upward extending" in this case refers to extending away from an upper face of the structural base 332, relative to the position of the nest floor 314 shown in FIG. 8. The side walls 377, including the supports 378, comprise sheet metal in this embodiment, but other materials and configurations may be used. At least one fence rail 379 extends between the fence supports 378. The fence rail 379 is at an elevated position (spaced from) the nest floor 314 and provides clearance for the eggs to roll under the rail 379 and through the egg outlet 317. A skirt or curtain may be hung from the rail 379 to help prevent birds from entering the egg collection enclosure 306 through the egg outlet 317. The nest pad 334 sits on the base 332 and is positioned between the side walls 377.

The example lowered position of the nest floor 314 shown in FIG. 8 may be referred to as a "starting" position of the floor for the following description. This may be a default position of the nest floor 314, which is used for laying eggs during the day. In this position, the lift cam member 328 is positioned such that its heel portion 348 is at positioned at least partially between the driveshaft 326 and the nest floor 314, such that the ramp 349 or heel portion 348 engages the nest floor 314 (i.e., the nest floor rests on the heel portion 348 or ramp 349). Specifically, in this example, the bracket 374 comprises a bracket pin 380 (best shown in FIG. 10) positioned over the ramp 349 of the lift cam member 328. In other embodiments, the bracket pin 380 may rest directly on the heel portion 348. The bracket pin 380 functions as a cam follower positioned near the front end 320 of the nest floor 314 and is landed on the rim 342 of the lift cam member 328. Rotation of the cam member 328 is thereby converted to vertical movement of front portion 370 of the floor via the bracket pin 380.

In FIG. 8, the lift arm 330 is shown in a lowered position and does not engage the nest floor 314, with the lift arm 330 essentially hanging freely downward from the driveshaft 326. However, in some embodiments, the lift arm 330 is supported in a more lifted, horizontal position (see FIG. 9) when the nest floor 314 is fully lowered, with the lift cam member 328 in the same position shown in FIG. 8. The lift arm 330 may be supported on a surface (not shown in FIG. 8) below the nest floor 314 and/or the distal end 360 of the arm may be coupled to the floor, as will be discussed below, Other configurations are also possible.

In the lowered "starting" position for this example embodiment, the nest floor 314 is slightly inclined from the back end 322 to the front end 320 at an angle of inclination (α1). This angle (α1) may, for example, be 10 degrees or less. The nest floor 314 is thus slightly tilted towards the egg outlet 317. In the lowered position, the back end 322 of the nest floor 314 rests on a support member 375 that extends between the sides of the nesting enclosure 305. The support member 375 is not shown in FIG. 8, 9 or 11 to 13, but it is shown in FIG. 10 discussed below. In this embodiment, in the lowered position, the back end 322 of the nest floor 314 is at a lower elevation than the front end 320, which rests directly or indirectly on the lift cam member 328. In other embodiments, the back end of the floor may rest on another support surface, support member, support bracket, or any other support structure of the system. In some embodiments, the lift arms 330 or another component of the floor movement mechanism may be configured to support the nest floor 314 in the lowered position.

Figure 9:
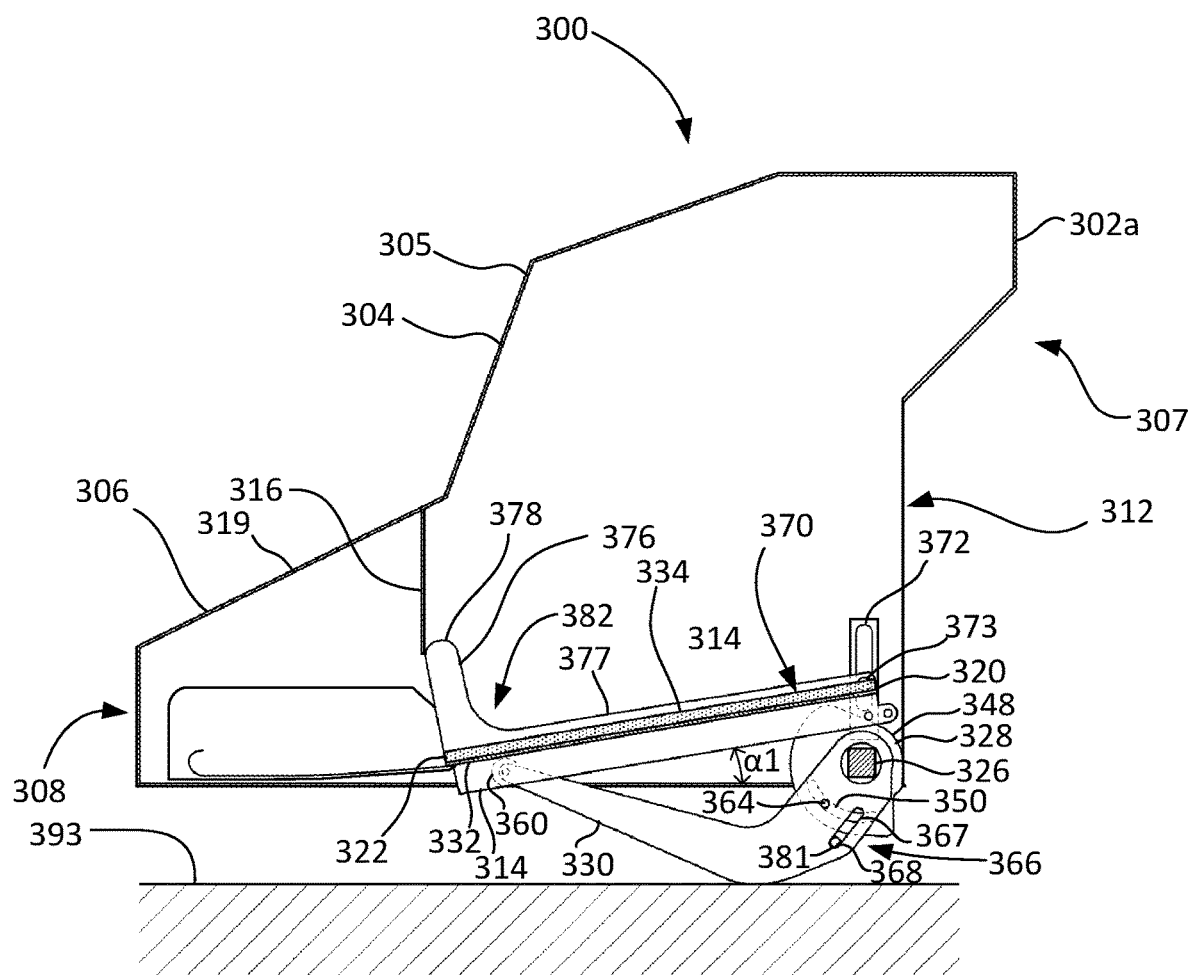
FIG. 9 is another side cross-sectional view of the nest box with the floor in a lowered position.

FIG. 9 is another side cross-sectional view of the system 300 with the nest floor 314 in the lowered position, but with lift arm 330 in an alternate "starting" position. In this position, rather than freely hanging down, the lift arm 330 rests on a support surface 393 such that the lift arm is closer to horizontal. The support surface 393 could be, for example, a floor, ground, or other structure above which the nest box system 300 is mounted. The lift arm 330 extends rearward from the driveshaft 326 and its distal end 360 engages a back portion 382 of the nest floor 314 as the lift arm rotates (as shown in FIG. 9). The lift cam member 328 is at the same position as in FIG. 8, with the ramp 349 (FIG. 5) engaging the bracket pin 380, such that the nest floor the nest floor 314 has the same angle of inclination (α1) as in FIG. 9. From this position, the lift cam member 328 can be rotated clockwise (by driveshaft 326) without moving the arm 330 until the arm first arm pin 364 in the arcuate slot 350 of the lift cam member 328 reaches the end 365 of the arcuate slot 350. The lift arm 330 may support the nest floor 314 in this configuration.

In the configuration of FIG. 9, gravity causes the catch pin 368 to rest in the first catch slot end 381, which is the lowest point of the catch slot 367 in this position of the lift arm 330. The catch slot 367 and catch pin 368 do not restrict rotation of the lift arm 330 relative to the lift cam member 328 in this position of the catch pin 368.

FIG. 10 is a lower, front, partial perspective view of the system 300. The nest pad 334 has been removed from the nest floor 314 in FIG. 10. The bracket 374 is mounted on an underside 384 of the structural base 332 of the nest floor 314. The bracket 374 in this example includes two parallel flanges 385a and 385b) extending downward from the structural base 332. The flanges 385a and 385b run parallel to a plane perpendicular to the longitudinal axis 327 of the driveshaft. The lift cam member 328 and lift arm 330 are positioned laterally between and generally below the flanges 385a and 385b when the nest floor 314 is in the lowered position. To more clearly show bracket pin 380, the nest floor 314 is shown slightly lifted off of the lift cam member 328. However, in normal operation, the bracket pin 380 rides the rim 342 of the lift cam member 328. Thus, the bracket pin 380 may also be referred to as a "cam follower pin." The roller 358 of the lift arm 330 may roll along the underside 384 of the floor panel 332 as the nest floor 314 is lifted by the lift arm (as described below).

The flanges 385a and 385b of the bracket 374 define aligned pairs of holes near the front end 320 of the nest floor 314. Specifically, a first pair comprise hole 386a in the first flange 385a and hole 386b in the second flange 385b, and a second pair comprises hole 386a in the first flange 385a and hole 386b in the second flange 385b. The bracket pin 380 is mounted in, and extends laterally between, the first pair of holes 386a and 386b. The bracket pin 380 may alternatively be mounted in the second pair of holes 387a and 387b, which may slightly alter the angle of inclination (α1) of the nest floor 314 in the lowered position. Only a single pair of holes or more than two pairs of holes for the bracket pin 380 may be provided in other embodiments. The two pairs of holes (386a/386b and 387a/387b) are spaced apart in the lengthwise direction of the nest floor 314 (i.e., a direction between the front and back ends 320 and 322 of the nest floor 314). The pairs of holes (386a/386b and 387a/387b) thereby provide a plurality of selectable pin positions for altering where the pin 380 is landed on the ramp 349 of the lift cam member 328. The selectable positions may, thus, provide different angles of inclination of the nest floor 314 in the lowered position.

Other means for fixing the bracket pin 380 to the nest floor 314 may also be used. Alternatively, the bracket 374 or bracket pin 380 may be omitted and the lift cam member may engage other structure of the floor, such as the structural base 332. As the cam member 328 is rotated by driveshaft 326, the bracket pin 380 is moved upward and/or downward by lift cam member 328. Other cam follower structures may be used in other embodiments (other than a pin).

The guide track 372 is also visible in FIG. 10.

In some embodiments, the lift arm 330 is coupled to the bracket 374, which may help guide or control movement of the lift arm 330 and/or the nest floor 314. For example, a lift arm guide mechanism 388 in this example includes a horizontally extending slot 390 defined through the second flange 385b and a guide member fixed to the lift arm 330 at or near the distal end 360. The slot 390 extends in the direction between front and back ends 320 and 322 of the nest floor 314, and the roller 358 of the lift arm 330 moves along this direction. The guide member could be a bolt 391 of the roller 358 (shown in FIG. 6) that extends outward from the lift arm 330 and into the slot 390. Any other guide member structure (e.g., pin) could be used. The slot 390 is sufficiently long to provide clearance of for movement of the lift arm 330 through the range of motion to lift the nest floor 314 as shown in FIGS. 9 and 11 to 13. This lift arm guide mechanism 388 may also assist with returning the nest floor 314 from a fully raised position back to a lowered position, as explained below.

Operation of the nest box system 300, including movement of the nest floor 314, will now be described in greater detail with reference to FIGS. 9 and 10 to 13. FIGS. 10 to 13 are side cross-sectional view of the system 300 similar to FIGS. 8 and 9, but with the nest floor 314, lift cam member 328 and lift arm 330 in different positions that illustrate movement of the nest floor 314.

Figure 11:
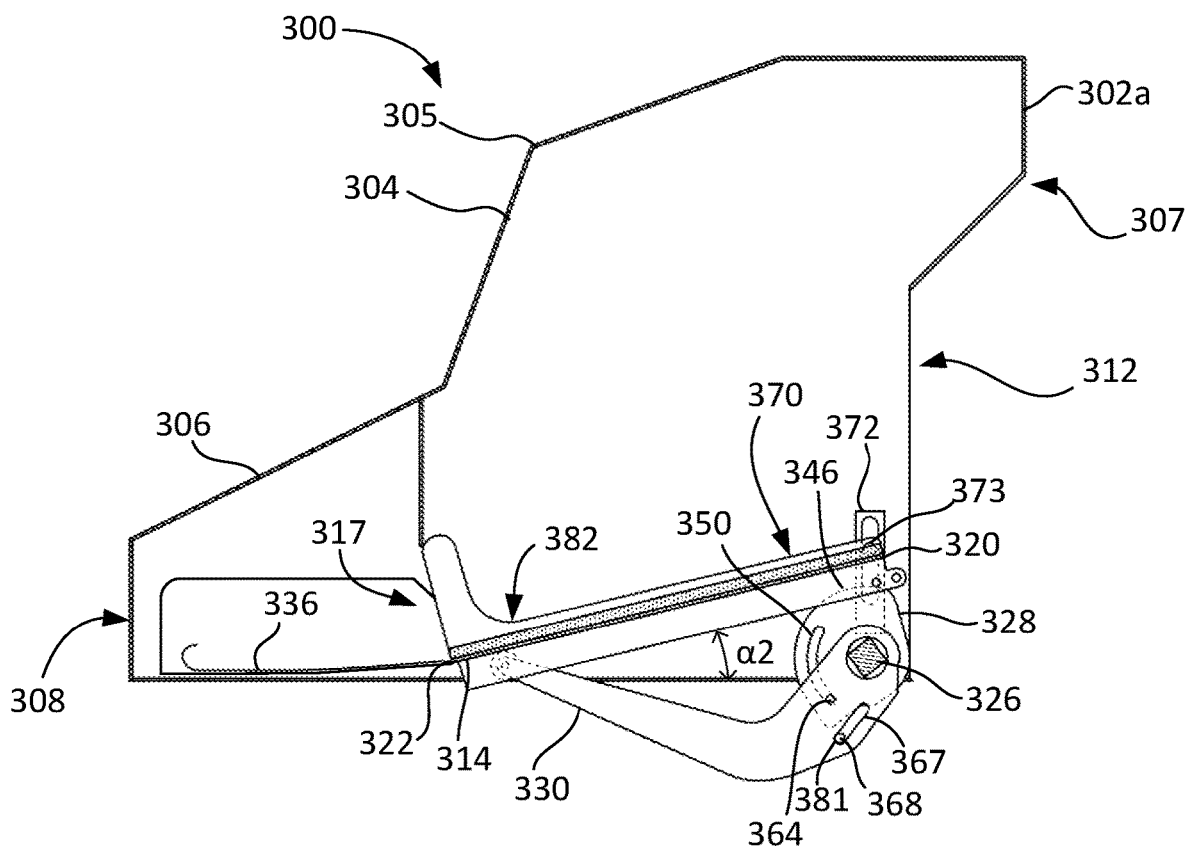
FIG. 11 is a side cross-sectional view of the nest box of FIGS. 8 and 9, showing the floor in an increased tilt position.

From the lowered position and perspective shown in FIG. 9, the driveshaft 326 is rotated counter-clockwise. The initial rotation of the driveshaft 326 rotates the lift cam member 328 to the position shown in FIG. 11, with the nose portion 346 rotated to a position under the nest floor 314, with the nest floor 314 now resting on the nose portion 346 rather than the ramp 349 or heel portion 348. The nose portion 346. FIG. 11 shows the nest floor 314 an "increased tilt position", where the tilt of the nest floor toward the back 308 is increased relative to the lowered position of FIG. 9. The movement of the nose portion 346 into position under the nest floor 314 forces the front end 320 of the nest floor 314 upward. This movement raises the front end 320 of the nest floor 314 relative to the back end 322, thereby increasing the angle of inclination to a new, increased angle (α2). In other words, the tilt of the nest floor 314 toward the back 308 and the egg collection enclosure 306 is increased. The increased angle of inclination (α2) may, for example, be 15 degrees or more, which may encourage any eggs on the nest floor 314 to roll through the egg outlet 317 and onto the egg belt 336.

If the lift arm 330 starts fully lowered, as shown in FIG. 8, the initial rotation of the driveshaft 326 may rotate the arm 330 toward the position shown in FIG. 11. However, from the starting position of FIG. 9, the initial rotation of the driveshaft 326 rotates the lift cam member 328 but not the lift arm 330 (due to the clearance provided by the arcuate slot 350 in the lift cam member 328).

In the increased tilt position of FIG. 11, the first arm pin 364 through the arcuate slot 350 of the lift cam member 328 is positioned against the end 365 of the arcuate slot 350, such that the end 365 (FIG. 7) of the arcuate slot 350 acts as a stop for the first arm pin 364.

From the increased tilt position of FIG. 11, continued rotation of the driveshaft 326 in the same clockwise direction imparts rotation to the lift arm 330 (via the first arm pin 364). The distal end 360 of the lift arm 330 lifts the back portion 382 (with back end 322) of the nest floor 314 relative to the front end 320. This lifting by the lift arm 330, therefore, rotates the nest floor 314 toward the front 307 of the nesting enclosure 305 as shown in FIGS. 12 and 13.

Figure 12:
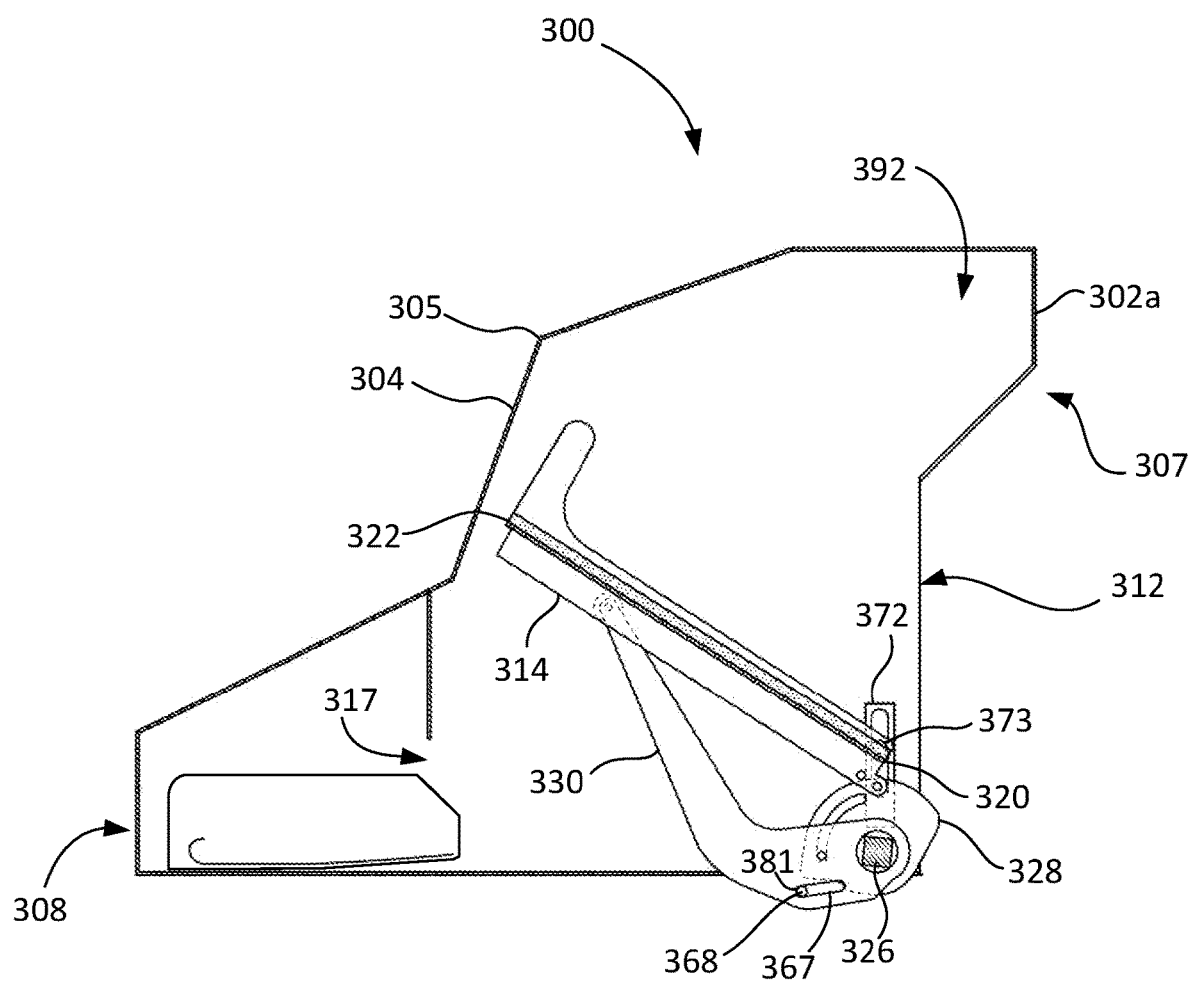
FIG. 12 is a side cross-sectional view of the nest box, showing the nest floor in a partially raised position.

FIGS. 12 and 13 show the nest floor 314 and lift arm 330 in partially and fully raised positions respectively. The continued rotation of the driveshaft 326 moves the lift arm 330 through the partially raised position shown in FIG. 12 (and toward the fully raised position of FIG. 13). This lifting of the back end 322 of the nest floor causes the nest floor to tilt toward the front opening 312. As the back end 322 of the nest floor 314 raises, birds may no longer be comfortable to stay on the nest floor 314 and may therefore exit the nest box 302a as the nest floor moves to the partially raised position. The angle of nest floor 314 for the partially raised position at which birds are encouraged to exit the nest box 302a may vary, and the angle may be continuously variable or adjustable by an operator.

From the partially raised position of FIG. 12, continued rotation of the driveshaft 326 in the same clockwise direction will move the lift arm 330 to a raised arm position, thereby moving the nest floor 314 to the fully raised position of FIG. 13. In this example, in the fully raised position, the nest floor 314 is slightly past vertical (i.e., rotated more than 90 degrees from a horizontal plane). This fully raised position of the nest floor 314 may encourage debris and waste to fall from the nest floor 314. The nest pad 334 may only be attached to the structural base 332 and/or the fence structure 376 at or near the back end 322 of the nest floor 314. This may allow the nest pad 334 to hang loose and encourage debris caught in the nest pad to shake loose. The housing 304 optionally defines an upper clearance area 392 of the nesting enclosure 305 that accommodates the fence structure 376 of the nest floor 314 when the nest floor 314 is fully raised. The upper clearance area 392 is positioned in a top-front region of the housing 304 and is forward of the opening 312 in this embodiment. However, embodiments are not limited to a particular housing shape.

For the movement shown in FIGS. 9 and 11 to 13, the driveshaft 326 rotates in a single direction, while imparting two different movements to the nest floor 314. That is, the rotation causes the nest floor to, first, increase the tilt toward the back 308 of the housing 304 and the egg outlet 317, and second, rotate toward the front 307 of the nest box 302a. At the same time, the driveshaft 326, lift cam members 328, and lift arms 330 are also beneficially positioned below the nest floor 314 during normal operation.

In the fully raised position in FIG. 13, the second catch slot end 383 is now the lowest point of the catch slot 367.

The relative position of the lift arm 330 and lift cam member 328 for clockwise rotation (as set by the arcuate slot 350) is such that the catch section 351 of the lift cam member 328 provides clearance for the catch pin 368 to move in the catch slot 367. Thus, when the lift arm 330 is rotated to the position of FIG. 13, with the second catch slot end 383 being the lowest point of the catch slot 367, the catch pin 368 now falls by gravity to the second catch slot end 383. In this position, the catch pin 368 is adjacent the catch section 351 of the lift cam member 328.

From the fully raised position in FIG. 13, the driveshaft 326 may be rotated in the opposite direction (i.e., counter-clockwise from the perspective of FIG. 13) to lower the lift arm 330. From the position in FIG. 13, counter rotation of the lift cam member 328 will cause the catch pin 368 to catch on the catch section 351 of the lift cam member 328, thereby rotationally locking the lift arm 330 to the lift cam member 328 for at least an initial part of the counter rotation. This counter-rotation of the lift arm 330 and lift cam member 328 moves the nest floor 314 back to the lowered position shown in FIG. 8 or FIG. 9. When the catch slot 367 rotates far enough that the first catch slot end 381 is again the lowest point, the catch pin 368 may fall by gravity back to the first catch slot end 381, as shown in FIGS. 9 to 12. The catch pin 368 falling back to the first catch slot end 381 may thereby release the catch mechanism 366.

The angle of inclination of the nest floor 314 in the lowered position (FIGS. 8 and 9) may be a fixed (non-adjustable) angle in some embodiments. However, it may be beneficial to allow adjustment that angle so that different inclinations are obtainable for one or all the positions shown in FIGS. 8 to 13. For example, a producer might notice that the eggs are not freely rolling out of the nest box 302a and may, therefore, wish to keep the nest floor 314 at a slightly more inclined position. Or, if eggs are rolling out of the nest box too fast the producer may wish to reduce the angle of inclination for the lowered position of the nest floor.

For the embodiments of FIGS. 3 to 13, one way to adjust the angle of inclination for the lowered position is simply prevent the lift cam member 328 from rotating all the way back as the nest floor 314 is being lowered. If the driveshaft 326 is driven by a drive system controlled by a control system that allows programmable and controlled rotation of the driveshaft, the system could be programed to start/stop at a given shaft and cam position to control the inclination of the nest floor. Other, more mechanical options are also possible. The drive system may be an electro-mechanical device with built-in feedback (such as the linear actuator 154 shown in FIG. 1B).

Another method for adjusting the angle of inclination in the lowered position of the nest floor 314, is to use a shim or other structure may to raise the back end 322 of the nest floor 314 (thereby reducing the starting angle of inclination).

Figure 14:
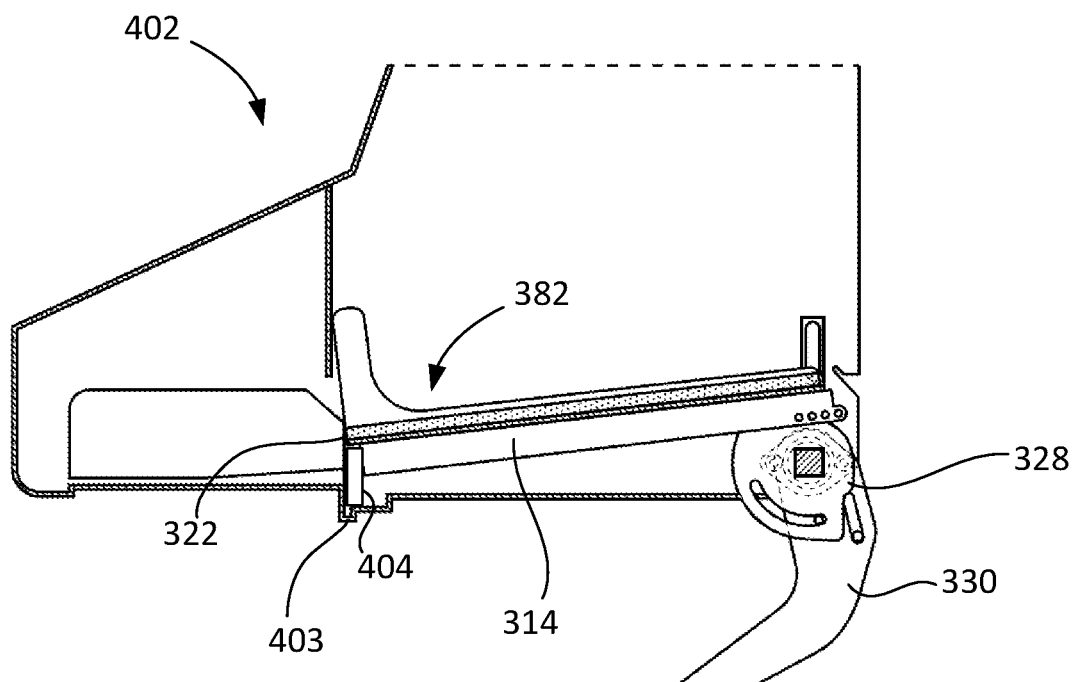
FIG. 14 is a side cross-sectional partial view of another example nest box system according to some embodiments.

FIG. 14 is a side cross-sectional partial view of a nest box 402 according to some embodiments. The nest box 402 is similar in structure and function to the nest boxes 302a and 302b of the system shown in FIGS. 3 to 13, with like reference elements signifying like elements. For example, the nest floor 314, lift cam member 328 and lift arm 330 are shown and function similar to the embodiment of FIGS. 3 to 13. The nest box 402 in FIG. 14, however, includes a spacer block 404 positioned under a back portion 382 of the nest floor 314 (i.e., under the nest floor 314 toward the back end 322). The spacer block 404 acts as an inclination adjustment device, which may be added to reduce the inclination of the nest floor 314 in the lowered position relative to the embodiment of FIGS. 3 to 13. The spacer block 404 vertically spaces the back end 322 of the nest floor 314 from a floor support member 403 or other support structure of the nest box 402, thereby reducing the tilt angle of the nest floor 314 in the lowered position. Other similar elements, such as a shim, may be used in a similar manner to adjust the inclination angle of the nest floor 314 in its lowered position.

Adding a shim or spacer to the system (as in FIG. 14), may also create a larger drop from the back end of the floor to the egg outlet, which may increase the likelihood of egg damage. To address this, in some embodiments, the egg belt 336 may be adjusted with the position of the nest floor such that the transition from the nest floor onto the belt is gentle.

Figure 15:
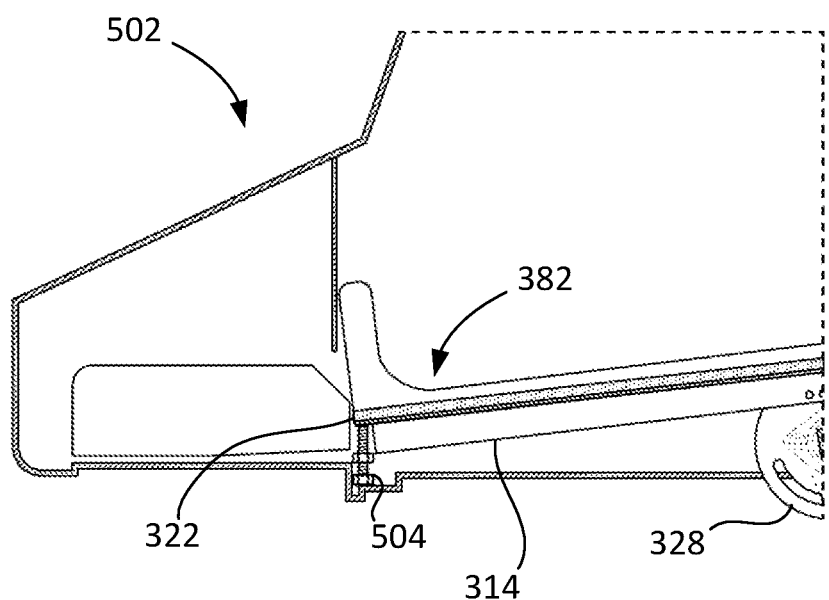
FIG. 15 is a side cross-sectional partial view of another example nest box system according to some embodiments.

FIG. 15 is a side cross-sectional partial view of a nest box 502 according to some embodiments. The nest box 502 is similar in structure and function to the nest boxes 302a and 302b of the system shown in FIGS. 3 to 13, with like reference elements signifying like elements. The nest box 502 in FIG. 15, however, includes a threaded bolt 504 that functions as an adjustable stop mechanism or spacer. The bolt 504 can be turned to adjust the inclination of the nest floor 314 in the lowered position. Any other adjustable stop mechanism that supports the back end of the floor when the floor is in the lowered floor position may be used. The adjustable stop mechanism may, for example, comprise a pin, an adjustable bracket or support member, or any other structure capable of supporting the back end 322 of the nest floor 314 and adjustable to change the elevation of the back end 322 in the lowered position.

In still another example, the angle of inclination for the lowered position may be adjusted by modifying the contact point between the nest floor 314 and the cam member 328. For example, a cam follower (such as a pin) landed on the lift cam member 328 may be adjustable along a lengthwise direction of the nest floor (i.e., front to back) to thereby adjust the angle of inclination for the lowered floor position.

Figure 16:
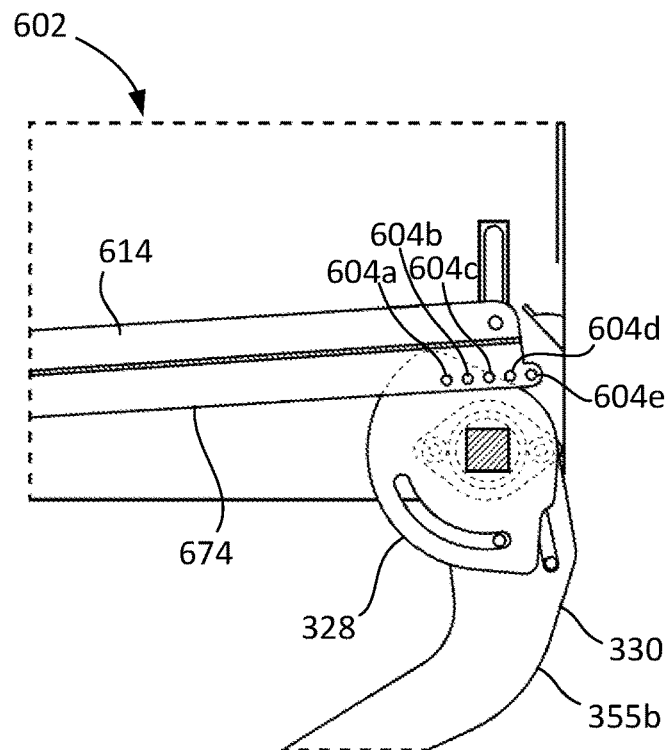
FIG. 16 is a side cross-sectional partial view of another example nest box system according to some embodiments.
Figure 17:
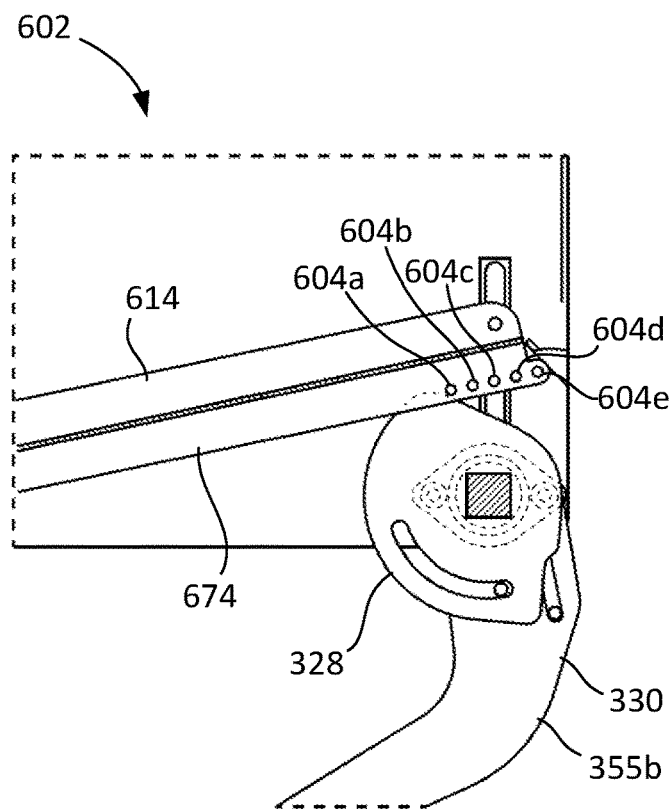
FIG. 17 is a side cross-sectional partial view of another example nest box system according to some embodiments.

FIGS. 16 and 17 are side cross-sectional partial views of another nest box 506 according to some embodiments. The nest box 602 is similar in structure and function to the nest boxes 302a and 302b of the system shown in FIGS. 3 to 13, with like reference elements signifying like elements. Only the second arm piece 355 of the lift arm 330 is shown (first arm piece 355a is removed in FIGS. 16 and 17).

In FIGS. 16 and 17, the nest floor 614 is similar to the nest floor 314 of FIGS. 3 to 13, except the bracket 674 includes more holes 680a to 680e for additional possible positions of a bracket pin (similar to pin 380 in FIG. 10). Each position for the bracket pin (i.e., provided by holes 680a to 680e) may provide a slightly different inclination angle of the floor 614 in the lowered position. For example, FIG. 16 shows the lowered position for a bracket pin in the second forward-most hole 680d, and FIG. 17 shows the lowered position for a bracket pin in the rear-most hole 680a. The lowered position of FIG. 16 has a slightly lower angle of inclination than FIG. 17. In other words, the holes 680a to 680e provide a plurality of selectable positions for the pin (similar to bracket pin 380 of FIG. 1) along the sides of the nest floor 614. Each of the plurality of hole positions provides a different contact location between the lift cam member 328 and the nest floor 614. Each contact location provides a slightly different tilt angle (angle of inclination).

In some embodiments, methods of adjusting the angle of inclination of the nest floor may be implemented without the two-part movement of the nest floor described herein (i.e., without the floor movement mechanism (1) initially increasing the tilt of the nest floor by raising the front end of the nest floor and then (2) rotating the floor toward the front opening).

In the embodiments described with reference to FIGS. 3 to 17, a combination of a lift cam member and a lift arm provided the two-part movement of the nest floor while the driveshaft rotates in one direction. The cam member is a first lift mechanism that provides the first part of the movement (increasing the angle of inclination or tilt toward the egg outlet) and the lift arm is a second lift mechanism that provides the second part of the movement (lifting the back end of the nest floor toward the front opening to expel a bird). However, the floor movement mechanism that provides this two-part movement by rotation of the driveshaft in one direction is not limited to cam members combined with lift arms. In other embodiments, other structural arrangements provide similar functionality.

FIGS. 18 to 21 are side cross-sectional partial views of a nesting system 700 comprising a nest box 702 according to another embodiment. The nest box 702 includes an adjustable nest floor 718 and housing 701 defining an enclosure similar to the nest box 302a or 302b of FIGS. 3 and 7. The housing 701 similarly has a front 704 and a back 706. The housing 701 defines a nesting enclosure 705 and an egg collection enclosure positioned behind the nesting enclosure, and an egg outlet 716 for eggs to roll from the nesting enclosure 705 into the egg collection enclosure 707 (onto egg belt 711). The housing 701 further defines a front opening 714. The nesting box 702 also includes a floor movement mechanism 713.

In this embodiment, the floor movement mechanism 713 comprises a driveshaft 726 positioned under the nest floor 718, similar to the nest floor 314 and driveshaft 326 in FIGS. 3 and 7. However, in this example, the floor movement mechanism does not include a cam plate. Rather, the floor movement mechanism comprises a lift arm 730 that is sized to engage a front portion 764 of the nest floor 718 (i.e., in front of a center of gravity of the nest floor 718). Vertical guide slots 719 are provided on either side of the nest floor 718 near its front end 722. The nest floor 718 is engaged with the guide slots 719 to allow limited vertical movement of the front end 722 of the nest floor 718. Front pins 721 attached to the floor 718 (near front end 722) are engaged in the slots 719. The pins 721 and slots 719 function as a sliding pivot mechanism. Any other suitable guide track mechanism or other mechanical structure to allow limited vertical movement of the front end 722 may be used in other embodiments.

A pair of lift arms 730 arms are provided, one for each side of the nest floor 718. Only one lift arm 730 is visible in FIGS. 18 to 21, but the other arm has a similar structure and configuration. The lift arms 730 are slidably coupled to the nest floor 718. In this specific example, a slot 750 aligned with the length of the nest floor 718 is defined in each side of the nest floor 718, and the distal end 756 of the corresponding lift arm 730 is engaged with the nest floor 718 by a rear pin 731 received in the slot 750. Thus, the distal end 756 of the lift arms 730 may travel a limited distance along the sides of the nest floor 718.

In this embodiment the driveshaft 726 again rotates in one direction for a two-part movement of the nest floor 718 that is similar to the two-part lifting movement of the nest floor 314 illustrated in FIGS. 8 to 13. The driveshaft 726 rotates in a clockwise direction from the perspective of FIGS. 18 to 21 to raise the nest floor 718 for this two-part movement. In this example, the lift arm 730 is fixed directly onto, and rotationally locked with the driveshaft 726.

Figure 18:
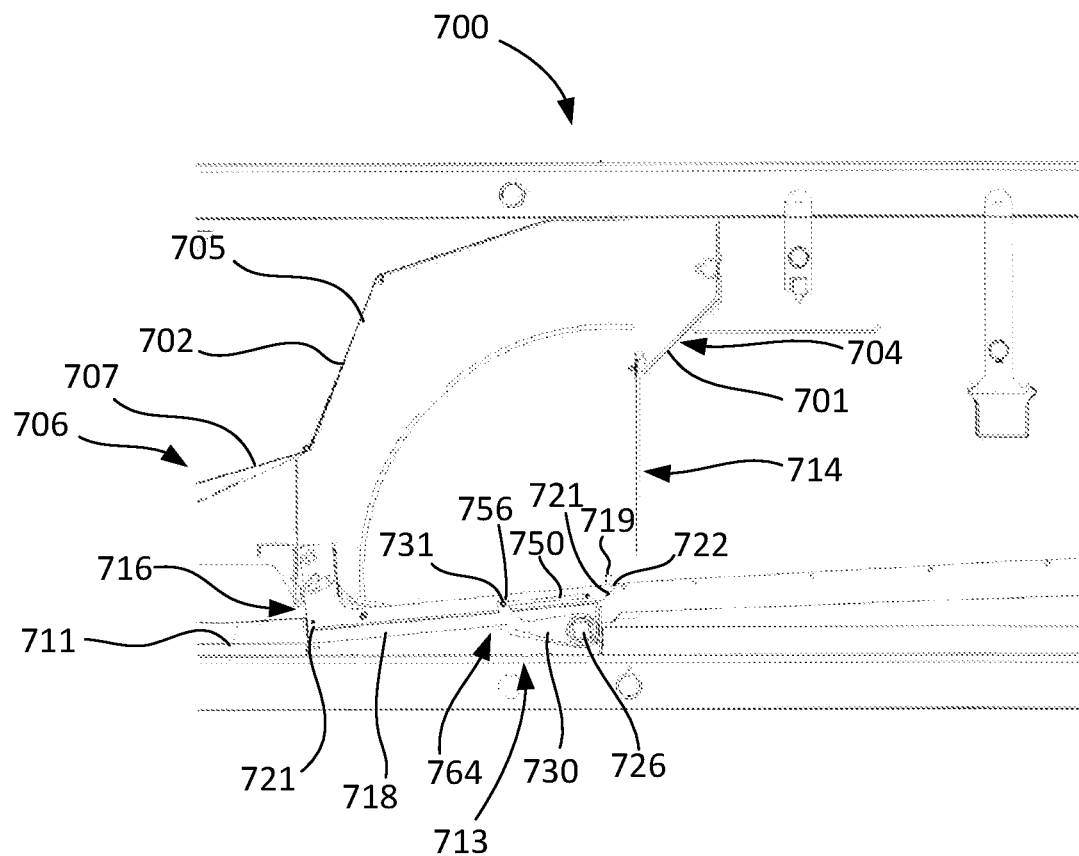
FIG. 18 is a side cross-sectional partial view of another nest box system according to some embodiments, showing a nest floor in a lowered position.
Figure 19:
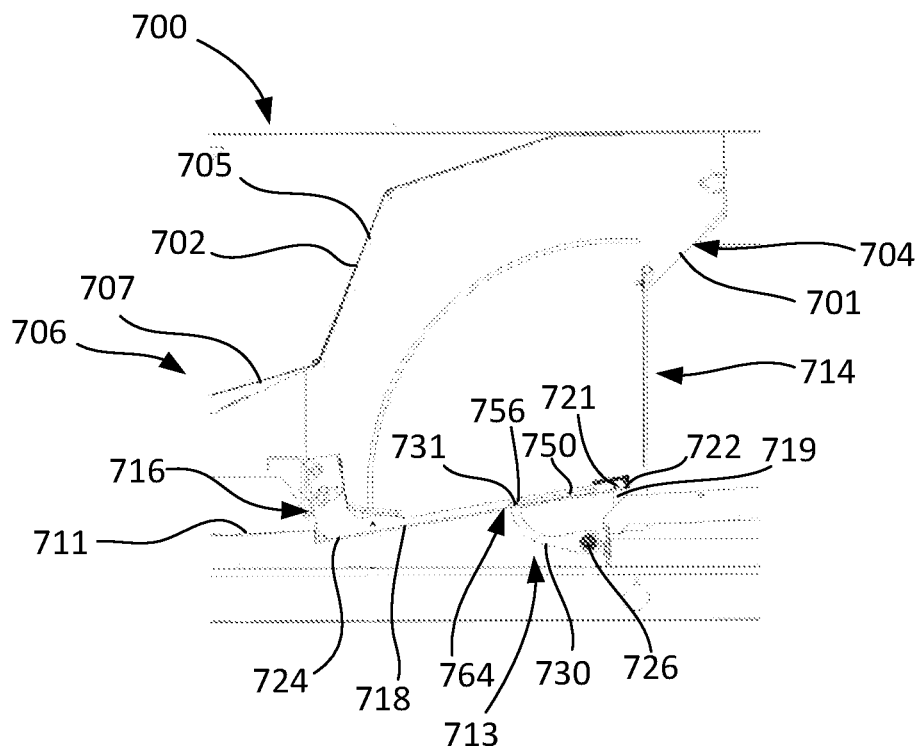
FIG. 19 is a side cross-sectional view of the system of FIG. 18, showing the nest floor in an increased tilt position.
Figure 20:
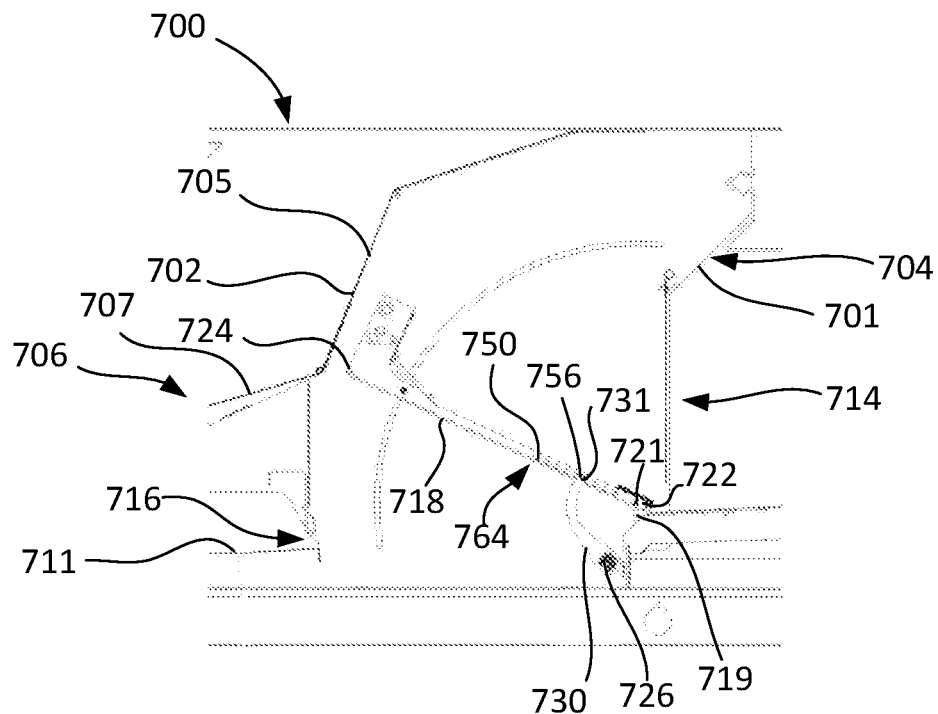
FIG. 20 is a side cross-sectional view of the system of FIGS. 18 and 19, showing the nest floor in a partially raised position.

From the lowered position of the nest floor 718 shown in FIG. 18, the driveshaft may rotate clockwise, thereby raising the lift arm 730. Because the distal end 756 of the lift arm 730 is in front of the nest floors centroid or center of gravity, the front end 722 of the nest floor 718 will rise for the initial rotation of the driveshaft. This will move the pin 721 upwards to the top of the vertical slot 719 in a similar motion as the cam member 328 in the embodiment of FIGS. 3 to 17. Thus, in a first part of the movement of the nest floor 718, the nest floor 718 will move to the increased inclination position shown in FIG. 19. The front pin 721 and vertical slot 719 are near the front end of the nest floor 718 in this embodiment. In other embodiments, the front pin 721 and vertical slot 719 may be positioned further rearward, so long as the front pin 721 and vertical slot 719 are forward of the center of gravity of the nest floor 718 and the distal end 756 of the lift arm.

Once the front pin 721 is at the top of the vertical slot 719, continued rotation of the driveshaft 726, will force the back end 724 of the nest floor 718 up. The nest floor 718 will then rotate toward the partially raised position of FIG. 20 and eventually to the fully raised position shown in FIG. 21. The rear pin 731 will slide in the corresponding slot 750 as the back end 724 of the nest floor 718 raises until past vertical. This slot 750 may prevent the front of the nest floor 718 from dropping down due to gravity. Thus, in a second part of the movement of the nest floor 718, the nest floor 718 may move to the fully raised position shown in FIG. 21.

Figure 21:
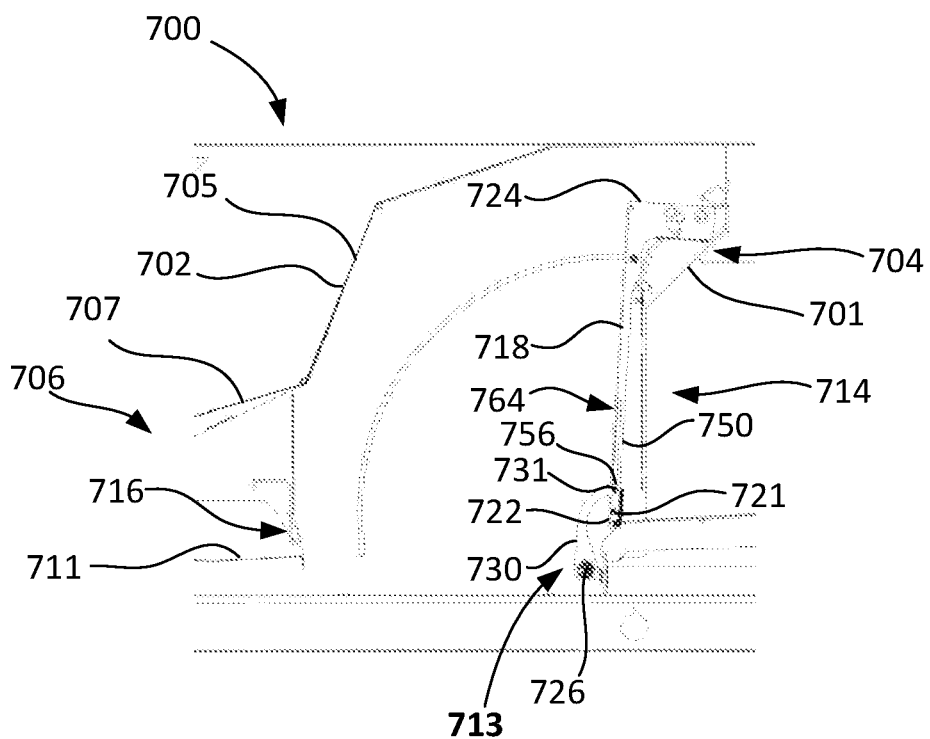
FIG. 21 is a side cross-sectional view of the system of FIGS. 18 to 20, showing the nest floor in a fully raised position.

From the fully raised position shown in FIG. 21, the nest floor 718 may be lowered by rotating the driveshaft in the counter-clockwise direction.

It may be advantageous to have a single mechanical drive mechanism (such as the linear actuator 154 in FIG. 2) turn the driveshaft 326 or 726 of the systems 300 or 700 described above) and provide the motion to as many nest floors as possible. However, as the driveshaft gets longer it may have a tendency to twist due to the applied load of the nest floor and any birds left in the boxes. If the driveshaft is long enough, this tendency to twist may become a problem as there could be a significant difference in inclination between the nest floors close to the mechanical drive mechanism, and those further away. To address this, one option is to make the driveshaft stiffer. However, due to geometry constraints, the size (e.g., thickness) of the driveshaft may be limited and it may not be possible to provide a sufficiently stiff driveshaft to prevent unacceptable twisting.

As another option, in some embodiments, a second driveshaft may be provided that is parallel to the first driveshaft (e.g., driveshaft 326 or 726 described above) such that load is distributed along the driveshafts. If the second shaft is run parallel to the first shaft, and they are rotatably coupled at two or more locations, the loads may be distributed across both shafts and therefore the angle of twist may be reduced. The location of the second driveshaft may not be critical. Thus, the second driveshaft may be positioned moved away from the first driveshaft and remainder of the floor movement mechanism. Thus, the second driveshaft may potentially be significantly larger and stiffer than the first driveshaft.

Figure 22:
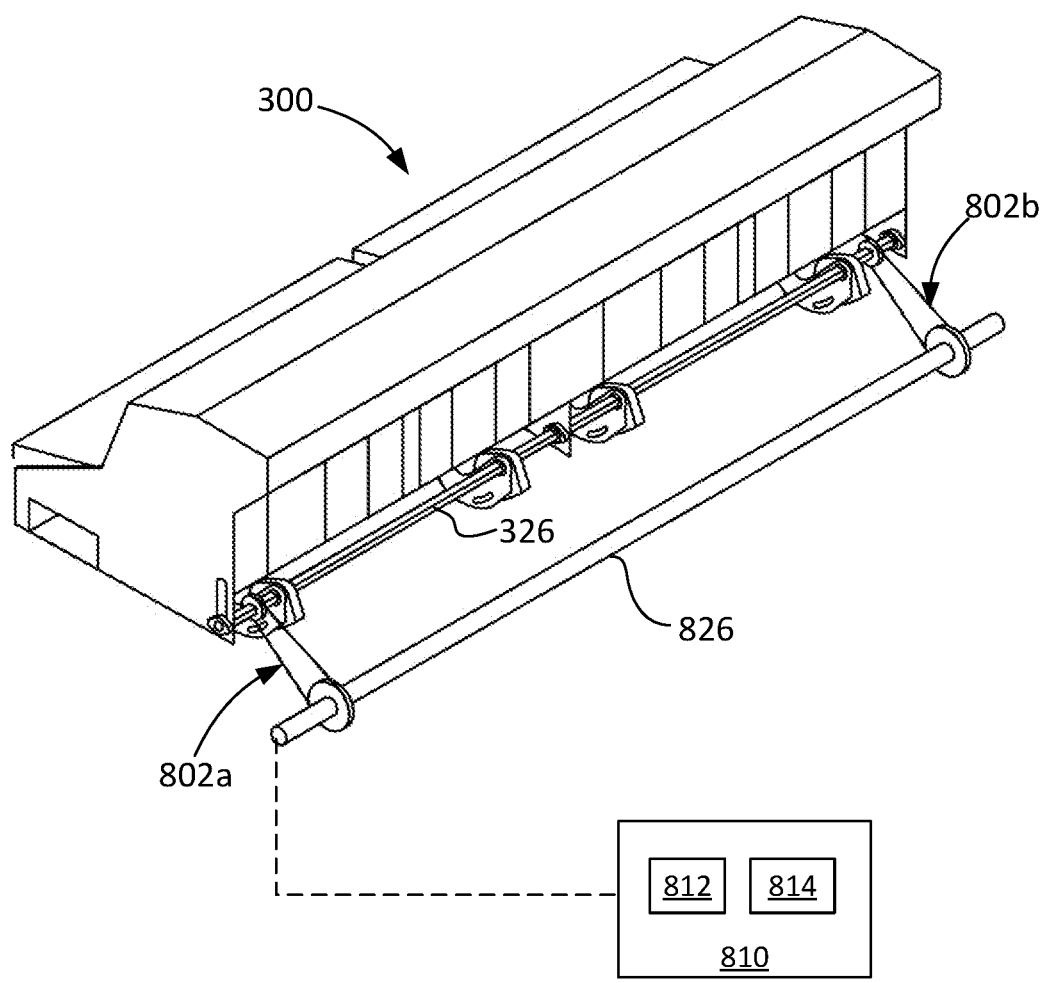
FIG. 22 is a perspective view of the nest box system of FIGS. 3 and 4, but further including a second driveshaft and drive system according to some embodiments.

FIG. 22 is a perspective view of the nest box system 300 of FIGS. 3 and 4 according to another embodiment, where the system 300 further includes a second driveshaft 826 that is parallel to the first driveshaft 326. The second driveshaft 826 is rotationally coupled to the first driveshaft 326 by first and second spaced apart sprocket and chain couplings 802a and 802b. Embodiments are not limited to sprockets and chains, and any suitable rotational coupling may be used (e.g., pulleys, belts, gears, linkages, etc.). The second driveshaft 826 has a larger diameter than the first driveshaft 326 and has a higher torsional stiffness. The second driveshaft 826 may be driven and may impart rotation to the first driveshaft 326. The couplings 802a and 802b may distribute the load along the first driveshaft 326.

The system 300 in this embodiment further includes an example drive system 810 comprising a motor 812 and a controller 814 operatively coupled to the motor 812. The motor 812 is coupled to the second drive shaft 826 and is operable to drive rotation of the second drive shaft 826 (and thereby the move the nest floor 314 shown in FIGS. 8 to 13, The controller 814 may be configured to move the nest floor 314 through the movements described above. The controller 814 may be external to the drive system 800. For example, the controller 814 may be positioned at a remote location.

In some embodiments, the floor movement mechanism may comprise a driveshaft (e.g., driveshaft 326 of FIGS. 3 and 4) and at least one actuator. The at least one actuator may comprise a lift arm as described herein (such as the lift arm 330 of FIGS. 5 and 6 or lift arm 730 of FIGS. 18 to 21). The floor movement mechanism may rotate the nest floor past vertical, but without initially increasing, the nest floor to an increased tilt position. That is, the floor movement mechanism may omit a structure described herein for causing initial rotation of the driveshaft to initially raise the front end of the nest floor relative to the back end.

It may be beneficial to reduce stress on a driveshaft actuating a floor movement mechanism of a nest box system. According to an aspect of the present disclosure, the floor movement mechanism may include two or more gears that provide a gear reduction to reduce stress on the driveshaft.

Figure 23:
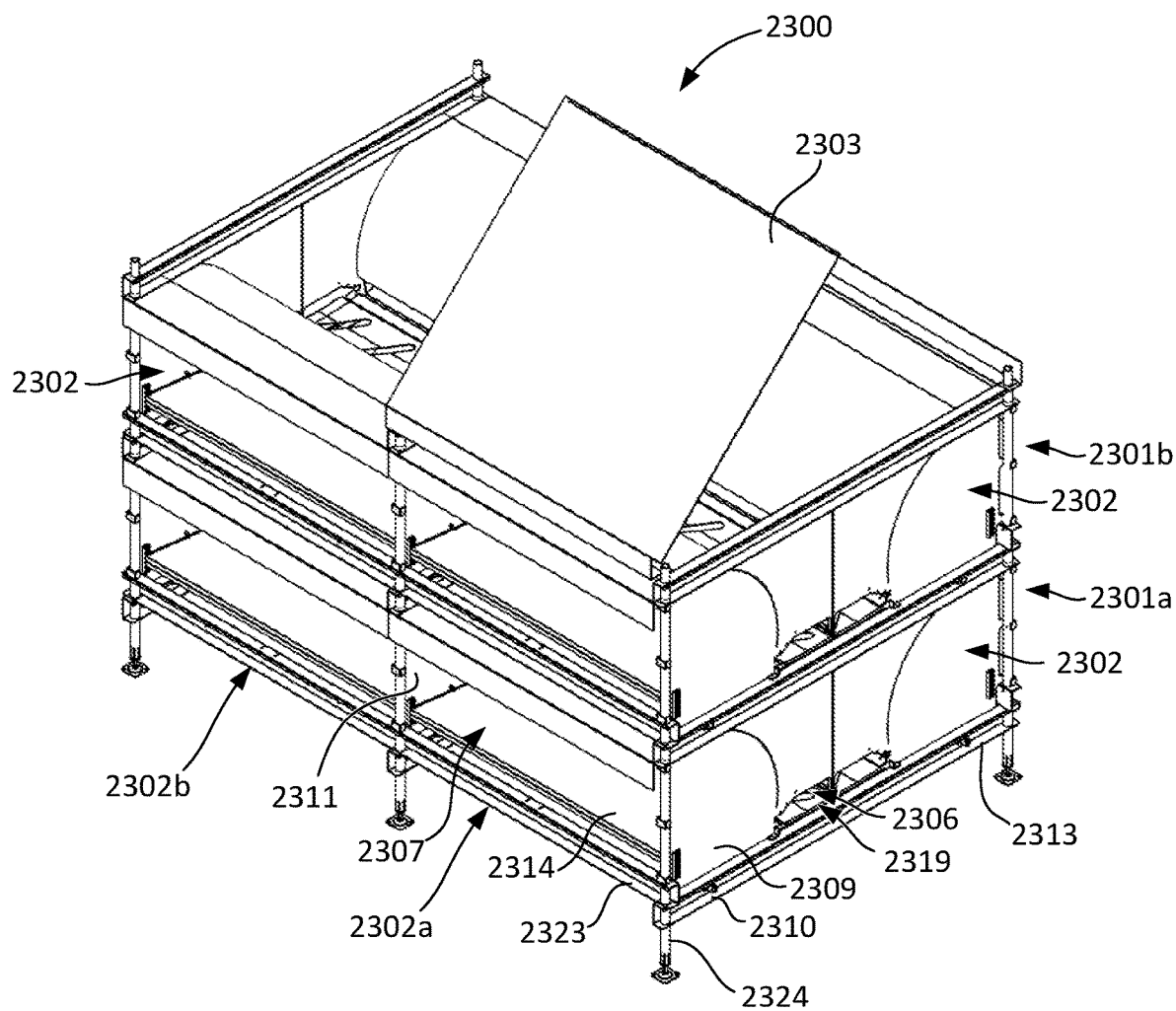
FIG. 23 is a perspective view of another nesting system according to some embodiments.

FIG. 23 is a perspective view of a nesting system 2300 including eight nest boxes 2302 arranged in two levels 2301a and 2301b. Each level 2301a and 2301b includes four of the nest boxes 2302 arranged in two rows of two, with the rows positioned back-to-back. Optional removable roof panels 2303 may be provided (additional roof panels may be provided to cover the entire top of the system 2300).

Each nest box is 2202 similar to other embodiments described herein, in that they each include a housing forming a respective nesting enclosure 2305 and a respective movable nest floor 2314. The nest floor 2314 is actuated by a floor movement mechanism 2315 (shown in FIG. 24) to: (1) to tilt the nest floor toward an egg collection area 2306 behind the nest floor 2314; and then (2) rotate the floor toward a front opening 2307 of the nest box. The movement through steps (1) and (2) may be actuated by rotation of a driveshaft 2326 (shown in FIG. 25) in a single direction.

Referring to nest box 2302a in FIG. 23, the nest box 2302 includes first side wall 2309 and a second side wall 2311. The second side wall 2011 is shared divider wall between nest box 2302a and the adjacent nest box 2302b (visible in FIG. 25). Also similar to other embodiments described the side wall 2309 defines a side opening 2319 from the egg collection area (e.g., for an egg belt to bring eggs from the nest box 2302) are also shown. The nest box 2302a is supported on a frame structure 2310, including lateral beams 2323, side beams 2313 and vertical supports 2324.

Figure 24:
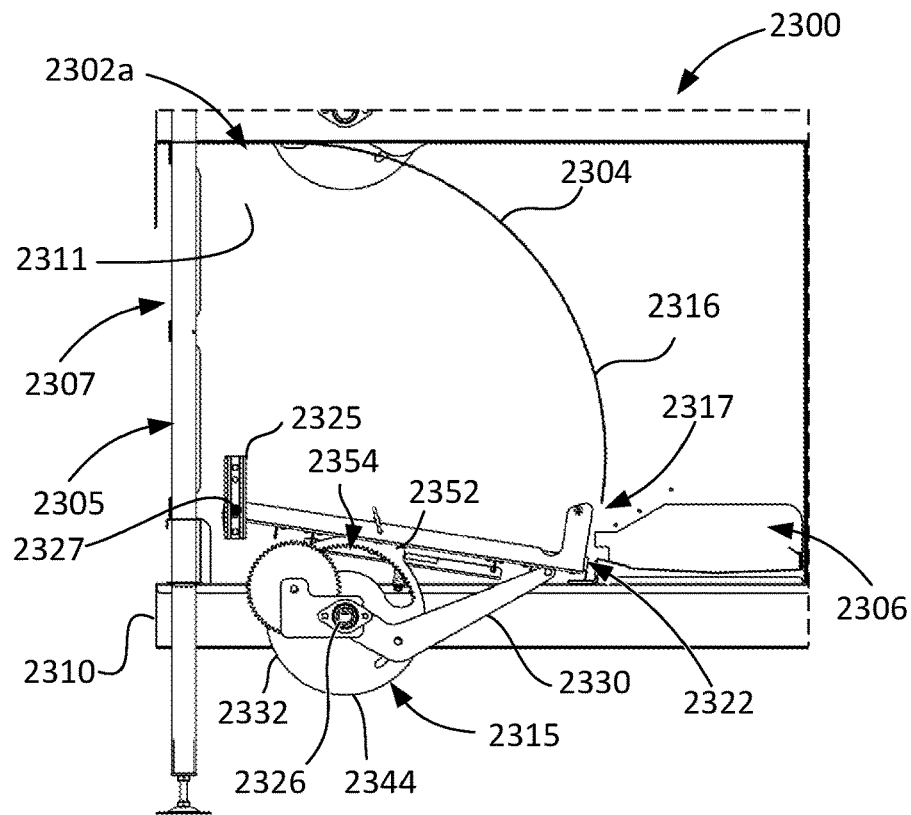
FIG. 24 is an enlarged partial side view of the system of FIG. 23, showing a nest box with the nest floor in a lowered position.
Figure 25:
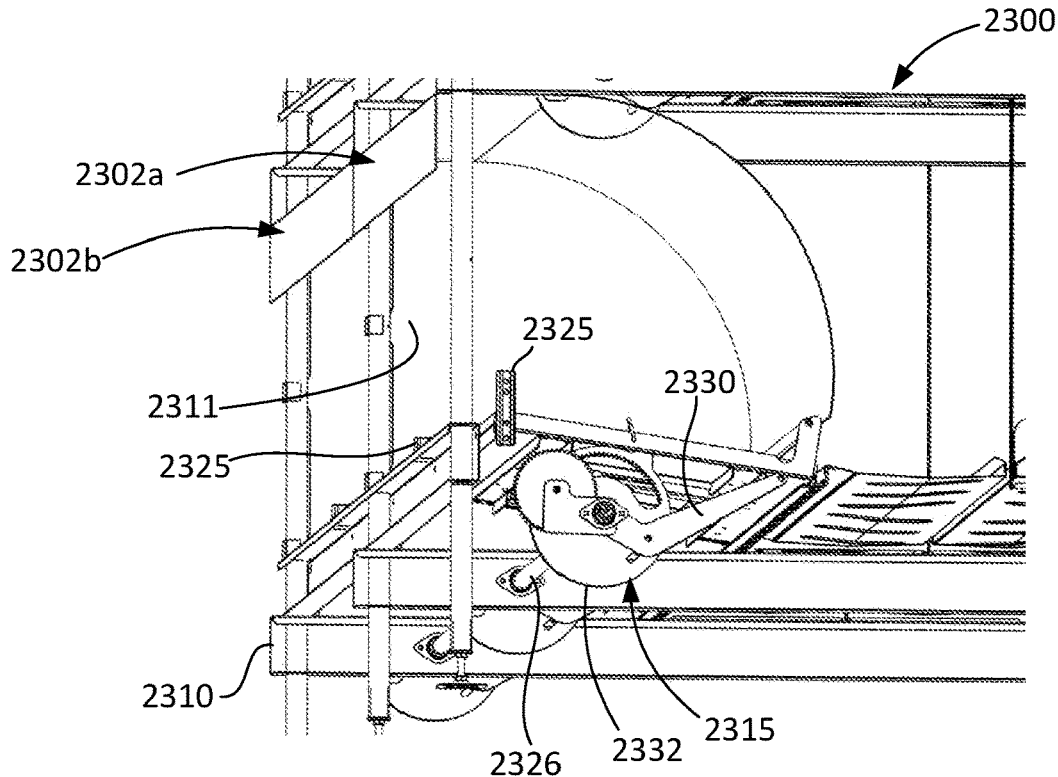
FIG. 25 is a bottom perspective, partial view of the system of FIG. 23, showing adjacent nest boxes.

FIG. 24 is an enlarged partial side view of the system 2300 of FIG. 23, showing the nest box 2302a with the nest floor in a lowered position. FIG. 25 is a bottom perspective, partial view of the system 2300 showing the nest box 2302a and an adjacent nest box 2302b. In FIGS. 24 and 25, the side wall 2309 (FIG. 23) and side beam 2313 (FIG. 23) of the frame structure 2310 are removed so that the floor movement mechanism 2315 is visible. As best seen in FIG. 25, the floor movement mechanism 2315 comprises a driveshaft 2326, a lift arm 2330, and a gear assembly 2332. The lift arm 2330 and gear assembly 2332 are mounted to the driveshaft 2326 and positioned under the nest floor 2314. The driveshaft 2326 actuates movement of the gear assembly 2332, which in turn actuates the lift arm 2330 to move the nest floor 2314, as will be explained in more detail below. The gear assembly 2332 provides a gear reduction. The gear reduction may reduce stress on the driveshaft 2326 by rotating a gear driving the lift arm more slowly than rotation of the driveshaft.

Alternatively, in other embodiments, a reversed gear reduction (i.e., a gear reduction in the other direction from the lift arm to the driveshaft) may be used to reduce the rotation speed of the driveshaft relative to a gear driving the lift arm. This alternate configuration may reduce the rotation of the driveshaft necessary to move the nest floor.

Referring to FIG. 24, the nest box 2302a includes a housing 2304 defining the nesting enclosure 2305 with a front opening 2307. A partition 2316 defining an egg outlet separates the nesting enclosure 2305 from an egg collection area 2306 behind the nesting enclosure 2305. In other embodiments, the nesting enclosure 2305 portion of the housing 2304 may include the egg collection area 2306. The housing 2304 in this embodiment includes the side wall 2309 (FIG. 23) and opposite side wall 2311, and the partition 2316. The partition 2316 is curved and also forms a top or roof of the nesting enclosure 2305. Embodiments are not limited to any particular shape or formation of the nesting enclosure 2305.

Similar to the embodiment of FIGS. 3 to 13, the distal end of the lift arm 2330 (with roller 2367 visible in FIG. 26) is positioned under and supports the nest floor 2314 when the nest floor 2314 is in the lowered position. The distal end of the lift arm 2330 in this embodiment is positioned near a back end 2322 of the nest floor 2314. The nest box 2302a also includes a pair of vertically aligned guide tracks 2325 and a pair of pivot members such as pins 2327 are fixed to opposite sides of the nest floor 2318 at or near the front end 2320. The pins 2327 would be hidden from view in FIG. 24 by the 2325, but are shown as a solid circle in FIG. 24 for illustrative purposes. These pins 2327 (or other pivot members) are slidably received in the guide tracks 2325. The guide tracks 2325 thereby provide a vertically sliding pivot mechanism, similar to the mechanism 371 of the embodiment shown in FIGS. 3 to 15. The guide tracks 2325 prevent forward/rearward movement of the front end 2320 of the nest floor 2314, while allowing limited vertical movement of the front end 2320. The guide tracks 2325 and pin 2327 also allow pivoting/rotation of the nest floor 2314 about the pin 2327.

Figure 26:
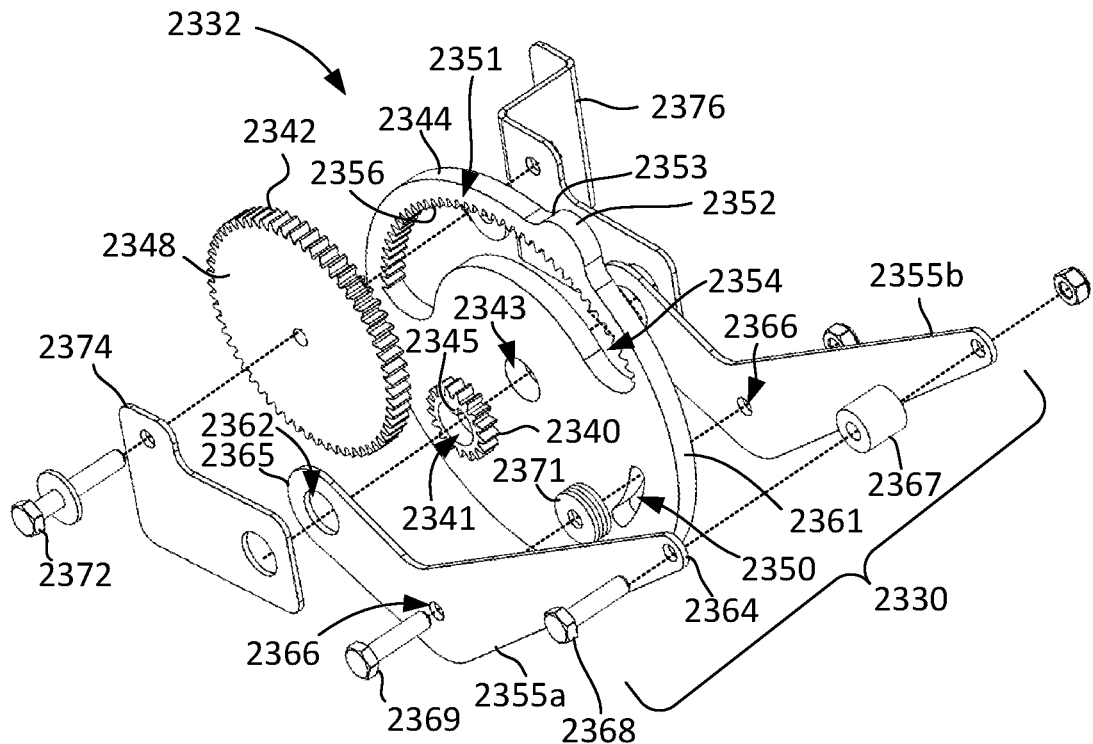
FIG. 26 is an exploded perspective view of a lift arm and gear assembly of the nest box of FIG. 24.

FIG. 26 is an exploded perspective view of the lift arm 2330 and gear assembly 2332 of the nest box 2302a shown in FIGS. 24 and 25. The remaining nest boxes 2302 shown in FIG. 23 are equipped with equivalent lift arms and gear assemblies.

Figure 27:
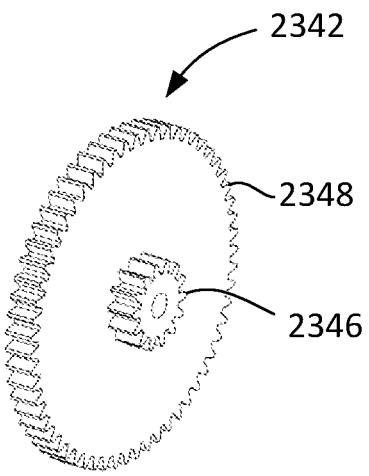
FIG. 27 is a perspective view of a compound gear of the gear assembly of FIG. 26 in isolation.

The gear assembly 2332 in this example provides two gear reduction stages. The gear assembly 2332 includes a driveshaft gear 2340 (which is a cylindrical gear in this embodiment), a compound gear 2342 and a cam gear 2344. The compound gear 2342 is shown in isolation in FIG. 27. As shown, the compound gear 2342 comprises a first, small gear 2346 and a second, large gear 2348, which are coaxial and fixed together such that they rotate together.

A first stage reduction is provided by the driveshaft gear 2340 and the second, large gear 2348 of the compound gear 2342. The driveshaft gear 2340 is mounted to and rotationally fixed to the driveshaft 2326. The driveshaft gear 2340 engages the large gear 2348, which is larger and has more teeth than the driveshaft gear 2340. Thus, rotation of the driveshaft 2326 at a first speed thereby drives rotation of the compound gear 2342 at a second, slower speed as determined by the gear ratio of the driveshaft gear 2340 and the large gear 2348.

The driveshaft gear 2340 defines a center hole 2341 axially therethrough for receiving the driveshaft 2326. The driveshaft gear hole 2341 comprises a radially inward extending key 2345 (best shown in FIG. 29), and the driveshaft 2326 defines a complementary key groove that receives the key 2345, such that the driveshaft gear 2340 is rotationally locked with the driveshaft 2326. Any suitable method to rotationally lock the driveshaft gear 2340 to the driveshaft 2326 may be used in other embodiments.

A second stage reduction is provided by the small gear 2346 of the compound gear 2342 and the cam gear 2344, which engage each other. The cam gear 2344 is generally plate-shaped and includes a ring gear portion 2351 and an outer cam portion 2352. The ring gear portion 2351 comprises an arcuate, toothed channel 2354 or cut-out defined axially through the cam gear 2344. The channel 2354 is sized to receive the small gear 2246 and extends in a circular arc about the center axis of the cam gear. The channel 2354 comprises inner ring-gear teeth 2356 that extend inward along the radially outward peripheral wall of the channel 2354. The small gear 2346 is received in the channel 2354 and engages the inner ring-gear teeth 2356 of the ring gear portion 2351. The ring portion 2351 has a larger gear size than the small gear 2346, such that rotation of the compound gear 2342 at the second speed rotates the cam gear 2344 at a third still slower speed.

The cam gear 2344 also defines a center hole 2343 therethrough that receives the driveshaft 2326, and the cam gear is received over the driveshaft, such that the driveshaft gear 2340 and the cam gear 2344 are coaxial in this embodiment. However, the center hole 2343 of the cam gear 2344 does not include a key portion, such that the cam gear 2344 is rotatable relative to the driveshaft 2326. The cam gear 2344 will rotate at a slower speed than the driveshaft gear 2340 due to the two-stage gear reduction.

The total gear reduction provided by the first and second stages is a function of the gear ratios of each stage. In the example of FIG. 26, the total gear reduction ratio may be 20 to 1. However, the gear reduction ratio may vary in other embodiments, and embodiments are not limited to a particular reduction ratio. For example, the ration may be 2 to 1 or less. The ratio may be between 2 to 1 and 20 to 1, or more than 20 to 1.

The cam gear 2344 comprises an outer periphery 2361 that is generally circular with a base circle radius. The cam portion 2352 is in the form of an extension or lobe which extends radially beyond the base circle radius, thereby providing a cam surface 2353 or ramp surface on the outer periphery of the cam gear 2344. The cam gear 2344 is, thus, both a gear and a cam member. The outer periphery of the cam gear 2344 is not limited to the particular shape shown in this example. Other outer periphery shapes that provide cam surfaces may be used in other embodiments.

As also shown in FIG. 26, the lift arm 2330 in this embodiment, similar to the lift arm 330 shown in FIG. 6, includes first and second L-shaped arm pieces 2355a and 2355b. The driveshaft gear 2340 and cam gear 2344 are positioned between the first and second arm pieces 2355a and 2355b. The first and second arm pieces 2355a and 2355b each define a respective pivot hole 2362 therethrough (near a proximal end 2365) for receiving the driveshaft 2326. In this example, the pivot hole 2362 is circular and sized to fit the driveshaft 2326 therethrough such that the lift arm 2330 can pivot about the driveshaft 2326. In other embodiments, the lift arm 2330 may instead be rotationally locked with the driveshaft 2326.

A roller 2367 is mounted in between the first and second arm pieces 2355a and 2355b by a bolt 2368 at a distal end 2364 of the lift arm 2330. A bolt 2369 is also received through the pin holes 2366 and functions similar to the pin 369 of the lift arm 330 in FIG. 6. That is, the cam gear 2344 defines an arcuate slot 2350 therethrough that receives the bolt 2369, and the slot 2350 allows a limited range of rotation of the lift arm 2330 relative to the cam gear 2344. Optional spacer washers 2371 are positioned between the cam gear 2344 and the first arm piece 2355, with the bolt 2369 also extending; through the washers 2371.

The compound gear 2342 is mounted on a bolt 2372, which forms a center axle for the compound gear 2342. First and second plates 2374 and 2376 are mounted to the driveshaft 2326 and bolt 2372 on opposite sides of the compound gear 2342, cam gear 2344 and lift arm 2330 to provide structural support. The first and second plates 2374 and 2376 may help secure the bolt 2372 in a stationary position relative to the driveshaft 2326, such that the center axis of the compound gear 2342 is also stationary. This may, in turn, ensure the cam gear 2344 rotates rather than the compound gear 2342 moving in an orbit about the driveshaft 2326. In essence, the compound gear 2342 is a planetary gear relative to the cam gear 2344, but with the center axis of the compound gear 2342 remaining stationary.

Figure 28:
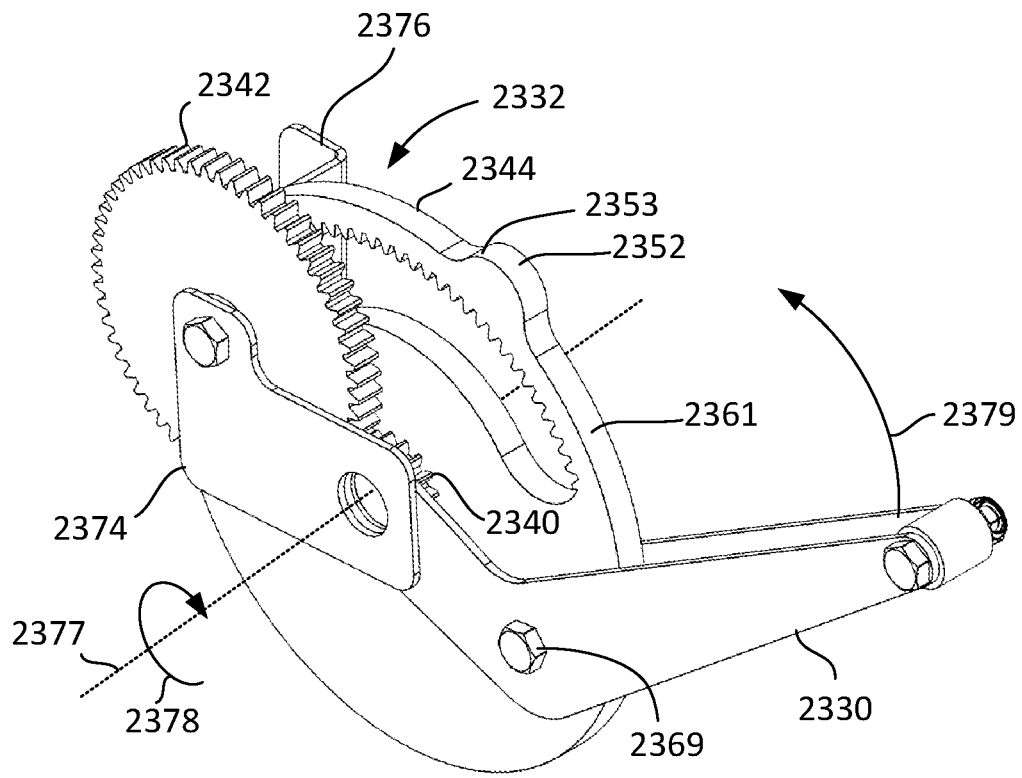
FIG. 28 is a perspective view of the assembled gear assembly and lift arm of FIG. 26.
Figure 29:
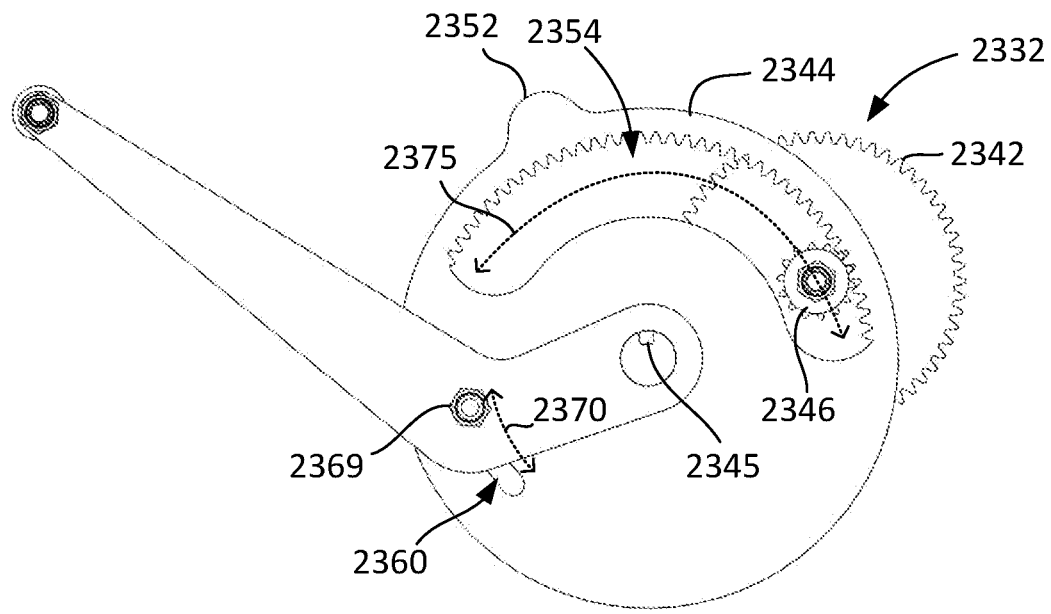
FIG. 29 is a side view of the assembled gear assembly and lift arm of FIGS. 26 and 28.

FIGS. 28 and 29 are perspective and side views, respectively, of the assembled gear assembly 2332 and lift arm 330. FIG. 28 shows the driveshaft gear 2340 engaged with the large gear 2348 of the compound gear 2342. In FIG. 29, the second plate 2376 (shown in FIG. 26) is removed so that the small gear 2346 of the compound gear 2342 is visible engaged with the cam gear 2344. The cam gear 2344 is rotatable relative to the driveshaft through an angular range. The angular range (indicated by arrow 2375 in FIG. 29) set by the arcuate channel 2354 of the cam gear 2344. For example, if additional rotational range is desired (e.g., to move the nest floor through a larger rotation) then the arcuate channel 2354 may be extended as needed.

Referring again to FIG. 28, rotation of the driveshaft gear 2340 about the driveshaft axis 2377 in a first rotational direction (indicated by arrow 2378) causes the cam gear to rotate in the opposite direction, thereby rotating and raising the lift arm 2330 (as indicated by arrow 2379).

Referring to FIG. 29, the arcuate slot 2350 in the cam gear 2344 and the lift arm pin 2369 received therein allow limited rotation of the lift arm 2330 relative to the cam gear 2344. This may allow the cam gear 2344 to rotate (relative to the lift arm 2330) through the range indicated by arrow 2370 in FIG. 29.

Turning again to FIG. 24, in the lowered position, the cam gear 2344 is positioned such that the nest floor 2314 rests on the circular periphery portion of the cam gear 2344 having the base radius. The cam portion 2352 is angularly positioned such that counter-clockwise rotation will rotate the cam portion 2352 upward to contact and push up the nest floor 2314. Starting from the lowered position, compound gear 2342 is positioned in the channel 2354 to allow counter-clockwise rotation of the cam gear 2344 sufficient to fully raise the lift arm 2330.

Figure 30:
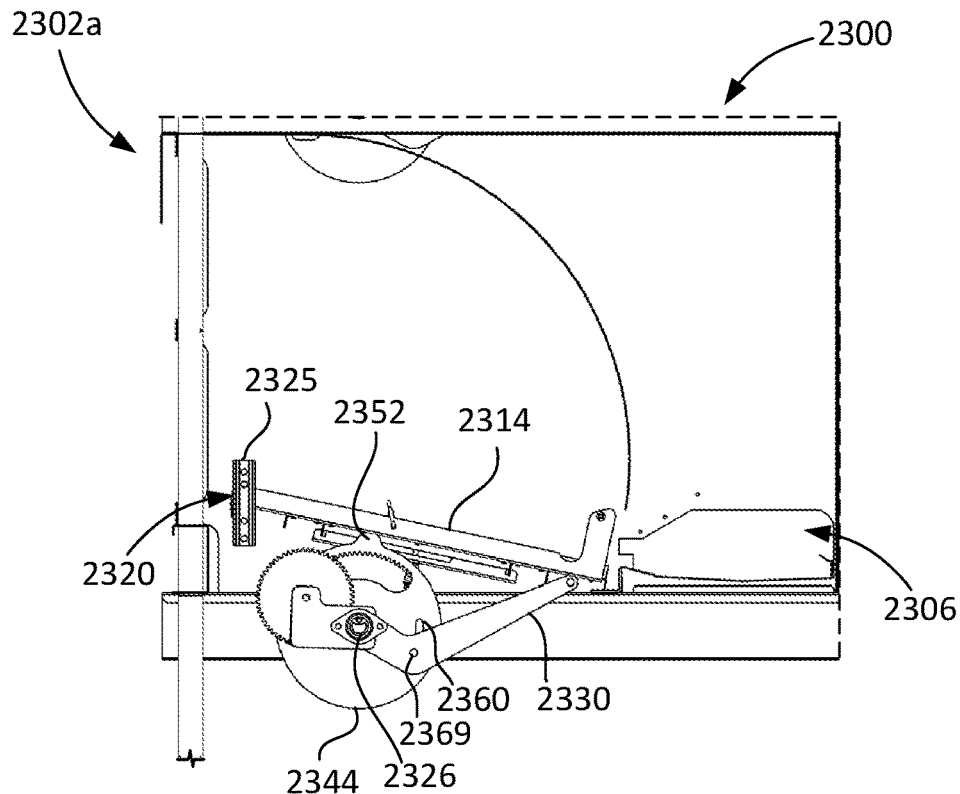
FIG. 30 is an enlarged partial side view of the system of FIG. 23, showing the nest box with a cam gear partially rotated and the nest floor in an "increased tilt" position.
Figure 31:
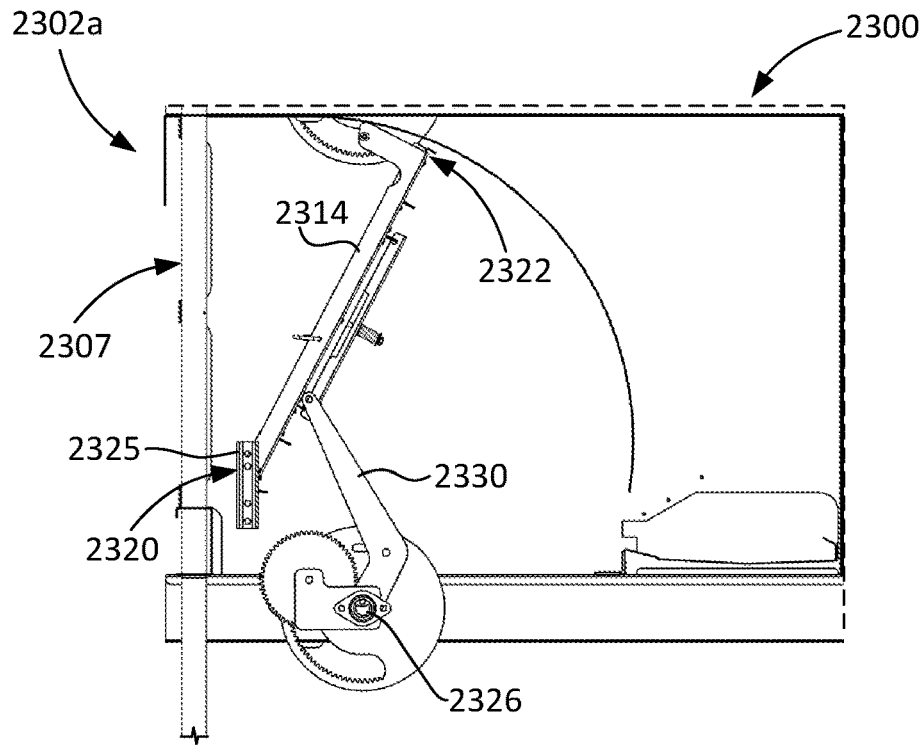
FIG. 31 is an enlarged partial side view of the system of FIG. 23, showing the nest box with the cam gear further rotated and the nest floor in a raised position.

FIG. 30 is an enlarged partial side view of the system 2300 of FIG. 23, showing the nest box 2302a with the cam gear 2344 partially rotated and the nest floor 2314 in an "increased tilt" position (similar to the position of the floor 314 shown in FIG. 11). FIG. 31 is an enlarged partial side view of the system 2300 of FIG. 23, showing the nest box 2302a with the cam gear 2344 further rotated and the nest floor 2314 in a raised position.

Starting from the lowered position of FIG. 24, the driveshaft 2326 is rotated clockwise, from the perspective of the side view of FIG. 24. The initial rotation of the driveshaft 2326 rotates the cam gear 2344 to the position shown in FIG. 30, with the cam portion 2352 rotated upward to a position under the nest floor 2314. Thus, the nest floor 2314 now rests on the cam portion 2352. The cam portion 2352 engages the underside of the nest floor 2314 at a position forward of the center of gravity of the nest floor 2314. The portion of the nest floor forward of its center of gravity may be referred to as a front portion herein. The cam portion 2352 thus lifts the front end 2320 of the nest floor 2314 to move the nest floor 2314 to the "increased tilt position" of FIG. 30. In the "increased tilt position," the nest floor is tilted toward the egg collection area 2306, which may encourage any eggs still on the nest floor 2314 to roll to the egg collection area 2306. The vertical guide tracks 2325 on opposite sides of the nest floor 2314 restrict forward-back movement of the nest floor 2314.

From the "increased tilt" position of FIG. 30, continued rotation of the driveshaft 2326 in the same clockwise direction causes the arm pin 2369 to catch at an end of slot 2360, such that rotation of the driveshaft 2326 imparts rotation to the lift arm 2330. The distal end 2364 of the lift arm 2330 lifts the back end 2322 of the nest floor 2314 relative to the front end 2320. The lift arm 2330 thus raises and rotates the nest floor 2314 toward the front opening 2307 of the nest box 2302a, and the nest floor 2314 is moved to the raised position shown in FIG. 31.

Because the front end 2320 of the nest floor 2314 is bound within a limited range of vertical movement by guide tracks 2325, the distal end 2364 of the lift arm 2330 may engage the nest floor 2314 forward of the floor's center of gravity, yet still raise the back end 2322 and rotate the nest floor 2314 toward the front opening 2307 as shown.

The nest floor 2314 may be lowered and returned to the lowered position by counter-rotation of the driveshaft 2326.

The floor movement mechanism 2315 may be adapted to rotate the nest floor 2314 past 90 degrees in other embodiments, similar to the embodiment shown in FIGS. 3 to 13. For example, the distal end 2364 of the lift arm 2330 may be slidably coupled to the nest floor, such that counter-rotation of the lift arm 2330 may pull the nest floor 2314 back from the over-90-degree (i.e., past vertical) position. The nesting enclosure 2305 may be modified to provide clearance for the movement of the nest floor 2314 past 90 degrees. Other modifications to allow rotation past 90-degree vertical position may be also implemented. Similar modifications may be made to the embodiment described below with reference to FIGS. 32 to 38.

Figure 32:
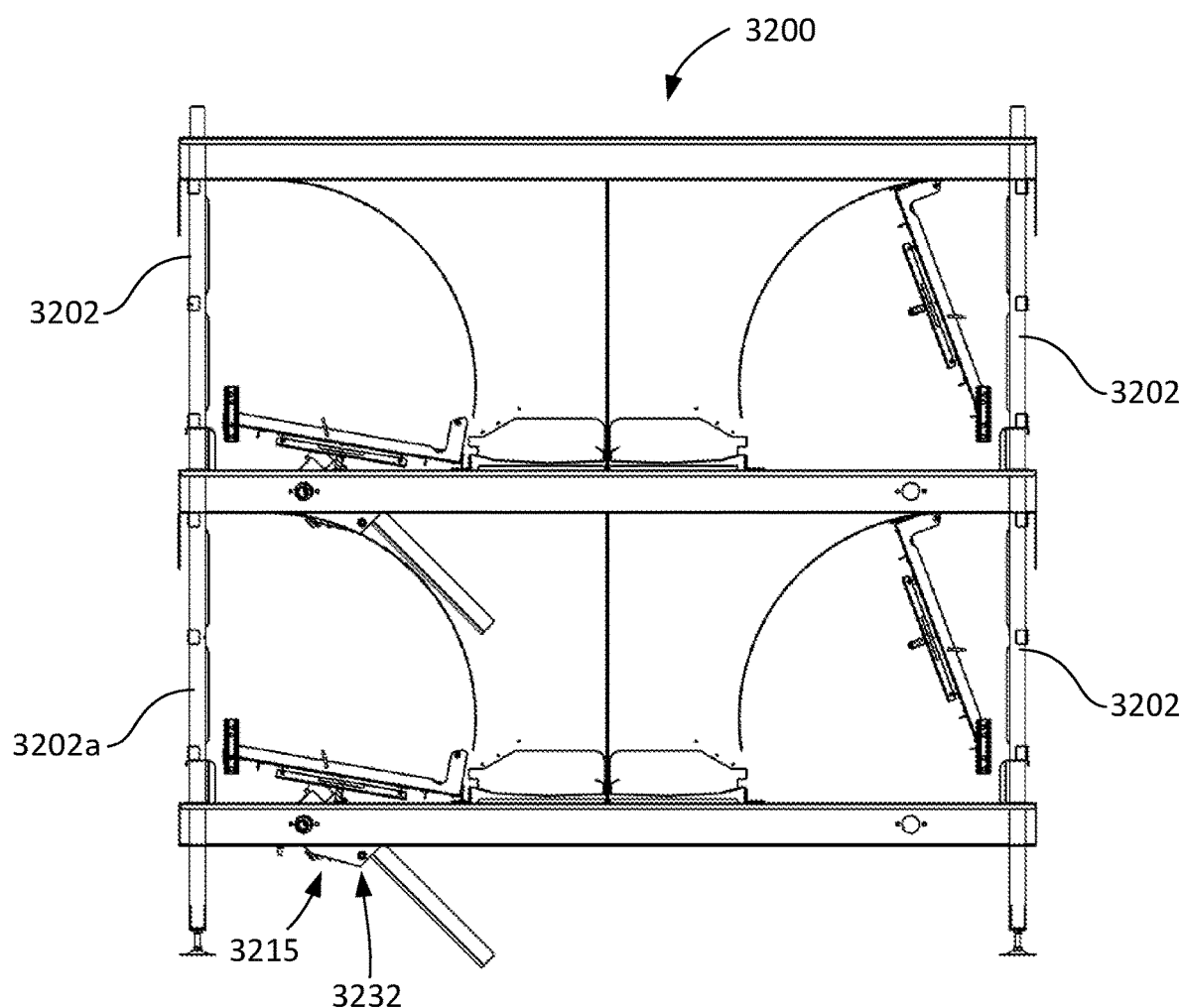
FIG. 32 is a side view of another nesting system according to some embodiments.

FIG. 32 is a side view of another nesting system 3200, which has two levels of stacked nest boxes 3202, similar to the system 2300 of FIG. 23. However, in this embodiment, the floor movement mechanism 3215 of each nest box 3202 comprises a rack and pinion system 3232. Side walls (similar to side walls 2309 of FIG. 23) are removed in FIG. 32 so the interior of nest boxes 3202 are visible.

Figure 33:
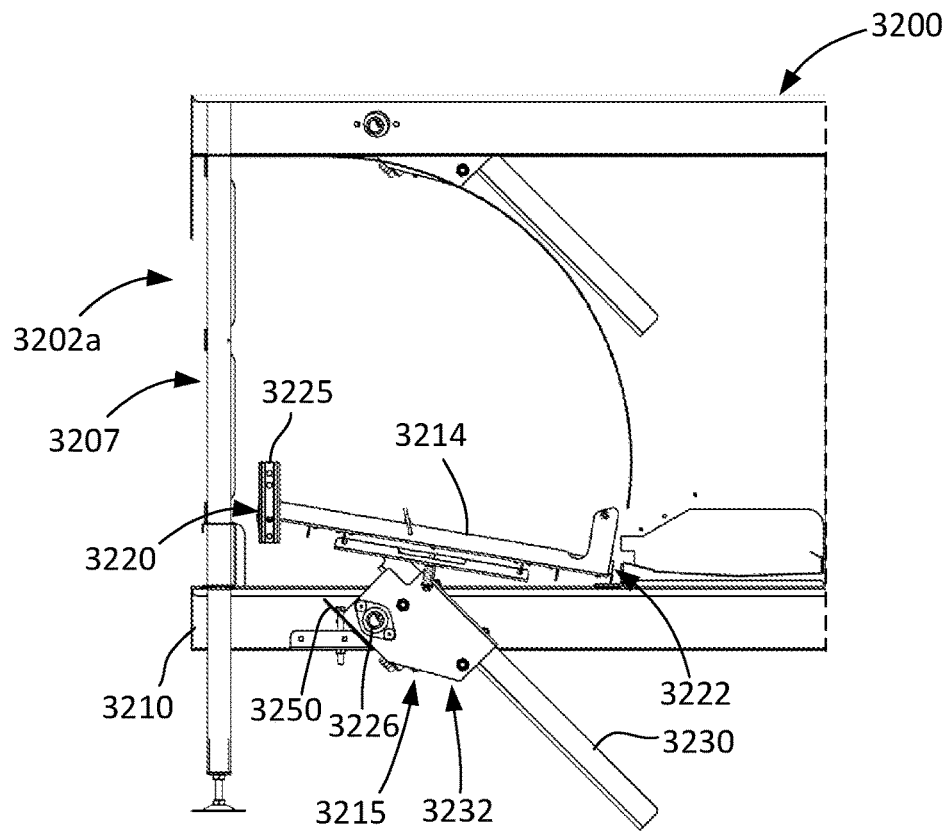
FIG. 33 is an enlarged partial side view of the nesting system of FIG. 32, showing a nest box with the nest floor in a lowered position.
Figure 34:
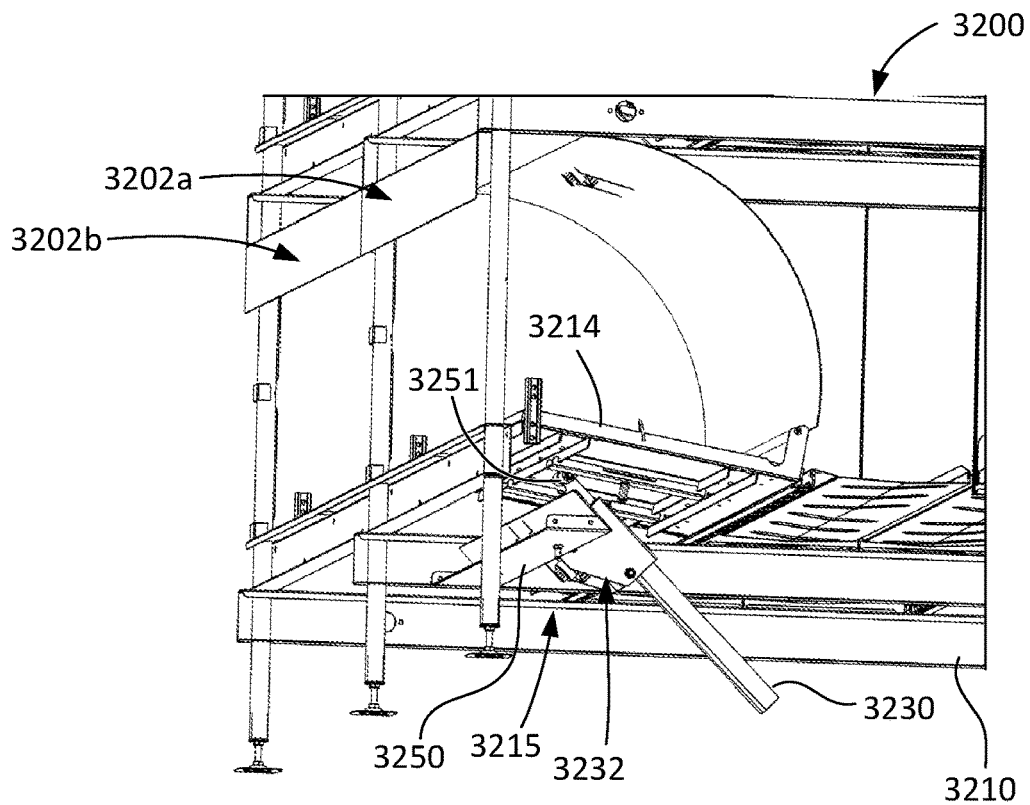
FIG. 34 is a lower perspective, partial view of the nesting system of FIG. 32, showing adjacent nest boxes.

FIG. 33 is an enlarged partial side view of the nesting system 3200 of FIG. 32, showing the nest box 3202a with the nest floor in a lowered position. FIG. 34 is a lower perspective, partial view of the nesting system 3200 of FIG. 32, showing two of the nest boxes 3202a and 320b. In FIGS. 33 and 34, a side beam 3213 (FIG. 32) of the frame structure 3210 and side walls are removed so that the floor movement mechanism 3215 is visible. The floor movement mechanism 3215 comprises a driveshaft 3226 (see FIG. 35), and a rack and pinion system 3232 with lift arm 3230. The rack and pinion system 3232 is mounted to the driveshaft 3226 and positioned under the nest floor 3214. The driveshaft 3226 actuates movement of the gear rack and pinion system 3232 and lift arm 3230 to move the nest floor 3214, as will be explained in more detail below. The rack and pinion system 3232 provides a gear reduction to reduce stress on the driveshaft 3226.

Figure 35:
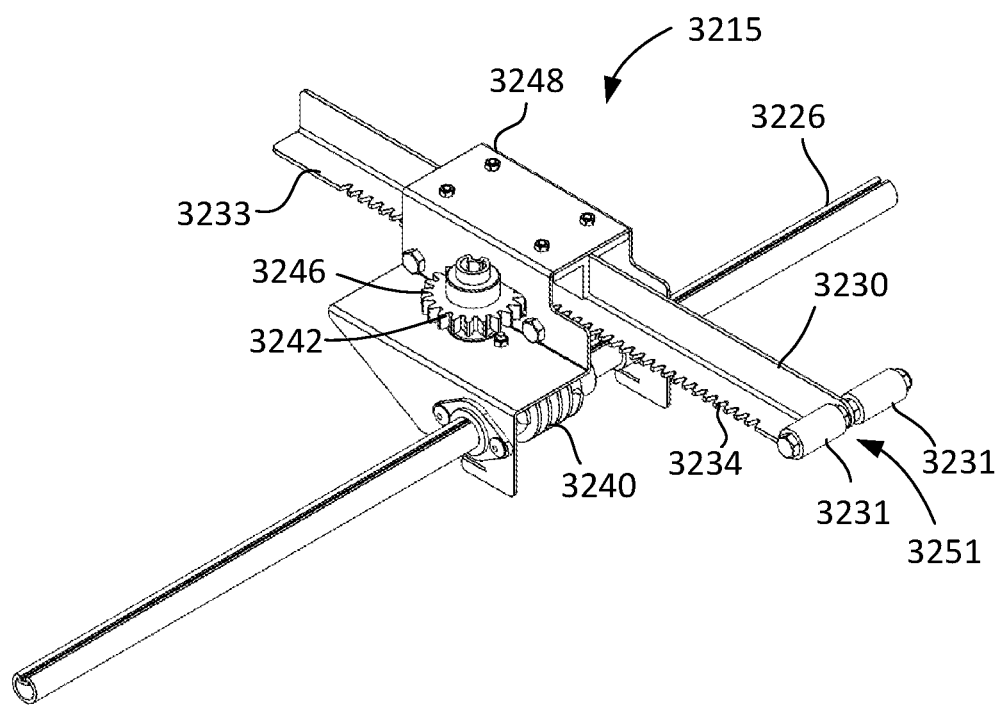
FIG. 35 is an upper and lower perspective view of the floor movement mechanism of the nest box of FIG. 33.
Figure 36:
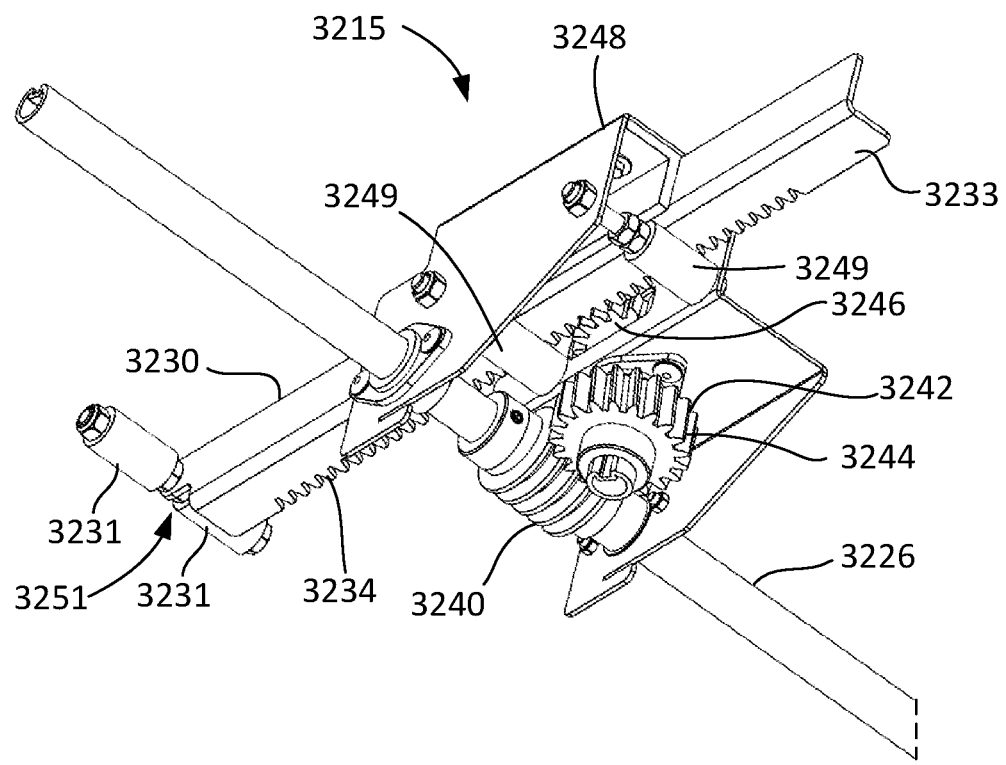
FIG. 36 is an upper and lower perspective view of the floor movement mechanism of the nest box of FIG. 33.

FIGS. 35 and 36 are upper and lower perspective views of the floor movement mechanism 3215 of the nest box 3202a in this embodiment. The floor mechanism 3215 includes a driveshaft 3226, the lift arm 3230, and the rack and pinion system 3232. The lift arm 3230 is comprises a straight, elongated rack member 3233 having teeth 3234 along its length. The rack and pinion system 3232 includes a gear assembly comprising a driveshaft gear in the form of worm gear 3240 and a compound gear 3242. The worm gear 3240 is coaxial with and mounted on the driveshaft 3226. The compound gear 3242 includes a first gear 3244 (shown in FIG. 36) and a second gear 3246 that are coaxial, and fixed together such that they rotate together. The first gear 3244 engages the worm gear 3240. The second gear 3246 functions as the pinion that engages the teeth 3234 of the lift arm 3230 (i.e., the rack) to linearly drive the lift arm 2330. In this example, the worm gear 3240 and the compound gear 3242 provide a gear reduction. An additional gear reduction could be provided by the compound gear 3242 and the lift arm 3230 in other embodiments. For example, in the present embodiment, the two gears 3244 and 3246 of the compound gear 3242 are approximately the same size, but different size ratios may be used to provide an additional reduction in other embodiments. The total gear reduction may be similar to the reduction provided by the embodiment of FIGS. 23 to 31, but embodiments are not limited to any particular gear reduction ratio.

As also shown in FIGS. 35 and 35, the floor movement mechanism 3215 includes a guide bracket 3248 that guides and supports the lift arm 3230. The guide bracket 3248 allows linear movement of the lift arm (i.e., along its axis), but restricts lateral or rotational movement. The guide bracket 3248 includes rollers 3249 (shown in FIG. 36) which support the lift arm 3230.

Rotation of the driveshaft 3226 rotates the worm gear 3240, which in turn rotates the compound gear 3242. Rotation of the compound gear 3242 in turn drives linear movement of the lift arm 3230.

The lift arm 3230 has rollers 3231 mounted at its front end 3251 for engaging the nest floor 3214 (as shown in FIG. 34).

As shown in FIGS. 33 and 34, the rack and pinion system 3232 is mounted under the nest floor 3214 at an angle by mounting bracket 3250, which is in turn mounted to the frame structure 3210. The lift arm 3230 is angled upward with its front end 3251 positioned to engage and lift the nest floor 3214 as the lift arm 3230 is axially moved forward and upward. In this example, the front end 3251 of the lift arm engages the underside of the nest floor 3214 forward of its center of gravity.

Figure 37:
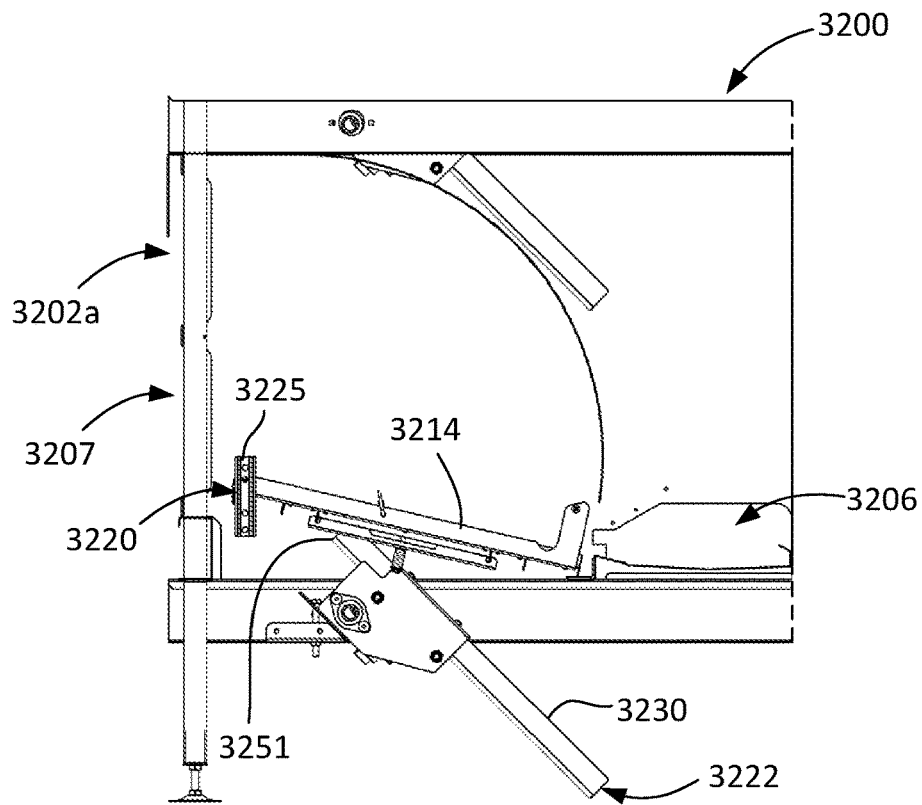
FIG. 37 is an enlarged partial side view of the nesting system of FIG. 32, showing a nest floor in an "increased tilt" position.
Figure 38:
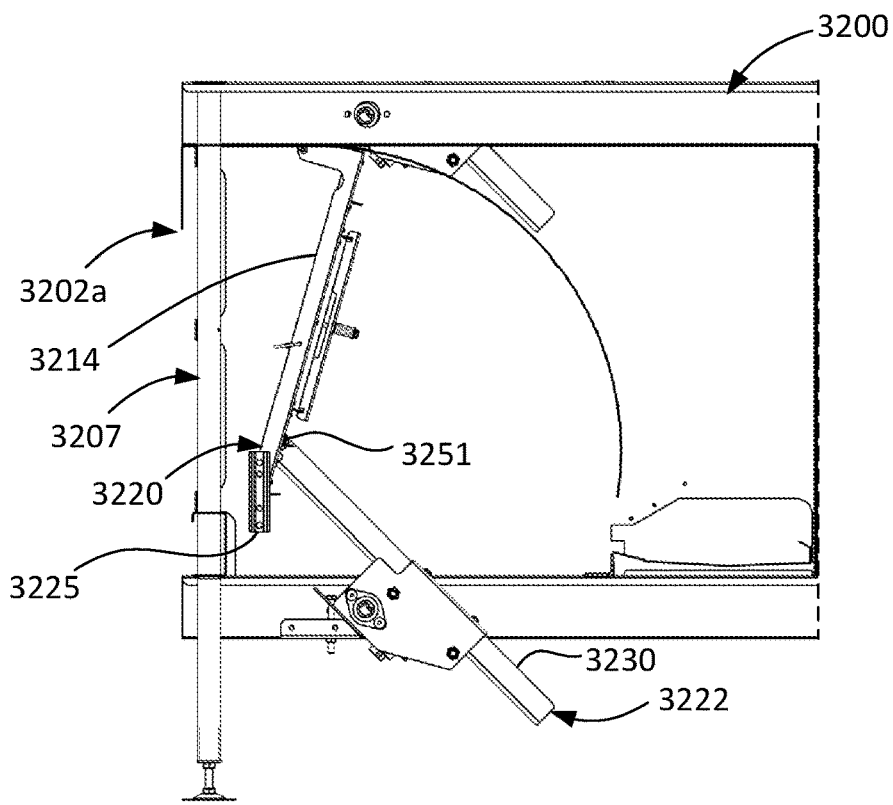
FIG. 38 is an enlarged partial side view of the nesting system of FIG. 32, showing the nest floor in a raised position.

FIG. 37 is an enlarged partial side view of the nesting system 3200 of FIG. 32, showing the nest box 3202a the nest floor 3214 in an "increased tilt" position. FIG. 38 is an enlarged partial side view of the nesting system 3200 of FIG. 32, showing the nest box 3202a with the nest floor 2314 in a raised position.

Starting from the lowered position of FIG. 33, the lift arm 3230 is in a retracted position, with its front end 3251 near the compound gear 3242 (visible in FIG. 35). From this position, the driveshaft 3226 is rotated clockwise, from the perspective of the side view of FIG. 33. The initial rotation of the driveshaft 3226 extends the lift arm 3230 upward and forward to the position shown in FIG. 30. Thus, the front end 3251 of the lifts the front end 3220 of the nest floor 3214 to move the nest floor 3214 to the "increased tilt position" of FIG. 37. In the "increased tilt position," the nest floor 3214 is tilted toward the egg collection area 3206.

From the "increased tilt" position of FIG. 37, continued rotation of the driveshaft 3226 in the same clockwise direction further extends the lift arm 3230 in the forward/upward direction. When the front end 3220 of the nest floor 3214 is raised to the uppermost position allowed by guide tracks 3225, further extension of the lift arm 3230 raises the hack end 3222 of the nest floor 3214 relative to the front end 3220. This raising of the back end 3222 rotates the nest floor 3214 toward the front opening 3207 of the nest box 3202a, moving the nest floor 3214 to the raised position shown in FIG. 38.

Because the front end 3220 of the nest floor 3214 is bound within a limited range of vertical movement by guide tracks 3225, the front end 3264 of the lift arm 3230 may engage the nest floor 3214 forward of the floor's center of gravity, yet still raise the back end 3222 and rotate the nest floor 3214 toward the front opening 3207 as shown.

The nest floor 3214 may be lowered and returned to the lowered position by counter-rotation of the driveshaft 3226.

Embodiments described herein are not limited to particular directions of rotation (e.g., right-handed, left-handed, clockwise, counterclockwise) of gears, lift arms, or other components. The particular directions of rotation shown from the perspective of the drawings and/or described herein are for illustrative purposes.

Elements and features of the various embodiments described herein may be combined with features and elements of other embodiments described herein. For example, the embodiments shown in FIGS. 24 to 38 may be modified or varied to include elements or features of one or more embodiments described above with respect FIGS. 1 to 23, or vice versa.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

We claim:

1. A bird nest box system comprising:
    a nesting enclosure having a front opening for a bird to enter and exit the nesting enclosure;
    a nest floor that is movable having a front end and a back end;
    and a floor movement mechanism that moves the nest floor between a lowered position and a raised position, the nest floor being mounted over the floor movement mechanism, the floor movement mechanism comprising:
    a driveshaft;
    a gear assembly coupled to the driveshaft and actuatable by rotation of the driveshaft; and
    a lift arm coupled to the gear assembly and actuatable by the gear assembly to move the nest floor, the nest floor being rotated toward the front opening by the lift arm by movement to the raised position,
    and wherein the gear assembly provides at least one gear reduction between the driveshaft and the lift arm.

2. The nest box system of claim 1, wherein the gear assembly comprises at least one driveshaft gear rotationally fixed to the driveshaft, and at least one additional gear coupled between the driveshaft gear and the lift arm, the driveshaft gear and the at least one additional gear providing the at least one gear reduction.

3. The nest box system of claim 2, wherein the driveshaft gear comprises a cylindrical gear.

4. The nest box system of claim 3, wherein the at least one additional gear comprises a cam gear having an outer periphery comprising a cam portion having a cam surface.

5. The nest box system of claim 4, wherein:
    in the lowered position, the front end of the nest floor is at a higher elevation than the back end, the nest floor thereby having a tilt angle toward the back end; and
    from the lowered position, initial rotation of the driveshaft in a first direction rotates the cam gear to engage the cam surface with a front portion of the nest floor, thereby lifting the front end of the nest floor and increasing the tilt angle toward the back end.

6. The nest box system of claim 5, wherein the cam gear is engaged with the lift arm, the lift arm has a distal end, and continued rotation of the driveshaft in the first direction further rotates the cam gear to rotate the lift arm and raise the distal end of the lift arm, the distal end thereby engaging the nest floor and raising the back end relative to the front to rotate the nest floor toward the front opening.

7. The nest box system of claim 4, wherein the at least one additional gear comprises a compound gear having first and second gears, and the first gear of the compound gear is engaged with the driveshaft gear.

8. The nest box system of claim 7, wherein the cam gear further comprises a ring gear portion engaged with the second gear of the compound gear.

9. The nest box system of claim 8, wherein the first gear of the compound gear is larger than the second gear, the first gear and the driveshaft gear provide a first gear reduction, and the second gear of the compound gear and the ring gear portion of the cam gear provide a second gear reduction.

10. The nest box system of claim 3, wherein the driveshaft gear comprises a worm gear, the worm gear and the at least one additional gear providing the at least one gear reduction.

11. The nest box system of claim 10, wherein:
    the at least one additional gear comprises a compound gear having first and second gears, and the first gear of the compound gear is engaged with the worm gear;
    the lift arm comprises a rack engaged with the second gear of the compound gear, and rotation of the compound gear thereby actuates linear movement of the lift arm.

12. The nest box system of claim 11, wherein:
    the lift arm has a forward end positioned to engage a front portion of the nest floor;
    in the lowered position, the front end of the nest floor is at a higher elevation than the back end, the nest floor thereby having a tilt angle toward the back end; and
    from the lowered position, initial rotation of the driveshaft in a first direction axially extends the lift arm, the extension raising a forward end of lift arm, thereby raising a front end of the nest floor and increasing the tilt angle toward the back end.

13. The nest box system of claim 12, further comprising a sliding pivot mechanism coupling the nest floor to the nesting enclosure, the sliding pivot being positioned forward of the forward end of the lift arm, the sliding pivot mechanism allowing limited vertical movement of the front end of the nest floor and allowing the nest floor to rotate about the sliding pivot mechanism.

14. The nest box system of claim 13, wherein continued rotation of the driveshaft in the first direction further extends the lift arm, thereby raising the back end of the nest floor, the nest floor pivoting about the sliding pivot mechanism and rotating toward the front opening of the nesting enclosure.

15. The nest box system of claim 1, wherein in the raised floor position, the nest floor is rotated past 90 degrees relative to a horizontal plane.

16. An adjustable floor system for a nest box comprising a nesting enclosure having a front opening and an egg collection area behind the nesting enclosure, the adjustable floor system comprising:
 a nest floor having a front end and a back end;
 a driveshaft; and
 a gear assembly coupled to the driveshaft and actuatable by rotation of the driveshaft; and
 a lift arm coupled to the gear assembly and actuatable by the gear assembly to move the nest floor,
 wherein the gear assembly provides at least one gear reduction between the driveshaft and the lift arm.

17. The adjustable floor system of claim 16, wherein the gear assembly comprises at least one driveshaft gear rotationally fixed to the driveshaft, and at least one additional gear coupled between the driveshaft gear and the lift arm, the driveshaft gear and the at least one additional gear providing the at least one gear reduction.

18. The adjustable floor system of claim 17, wherein the at least one additional gear comprises a cam gear having an outer periphery comprising a cam portion having a cam surface.

19. The adjustable floor system of claim 18, wherein the at least one additional gear comprises a compound gear having first and second gears, and the first gear of the compound gear is engaged with the driveshaft gear.

20. The adjustable floor system of claim 19, wherein the cam gear further comprises a ring gear portion engaged with the compound gear.

21. The adjustable floor system of claim 20, wherein the first gear is larger than the second gear, and the first gear engages the driveshaft gear, providing a first gear reduction, and the second gear engages the ring gear portion of the cam gear, providing a second gear reduction.

22. The adjustable floor system of claim 17, wherein the driveshaft gear comprises a worm gear, the at least one additional gear comprises a compound gear having first and second gears, and the first gear of the compound gear is engaged with the worm gear, the worm gear and the compound gear providing the at least one gear reduction.

23. The adjustable floor system of claim 22, wherein the lift arm comprises a rack, and the rack engages the second gear of the compound gear, the gear assembly thereby actuating linear movement of the lift arm.

* * * * *